United States Patent
Pecker et al.

(10) Patent No.: US 12,498,325 B2
(45) Date of Patent: Dec. 16, 2025

(54) ACCOUNTING FOR ERRORS IN OPTICAL MEASUREMENTS

(71) Applicant: S.D. SIGHT DIAGNOSTICS LTD., Tel Aviv (IL)

(72) Inventors: Sharon Pecker, Rehovot (IL); Yochay Shlomo Eshel, Sde Warburg (IL); Amir Zait, Binyamina (IL); Dan Gluck, Kadima (IL); Noam Yorav-Raphael, Tekoa (IL); Arnon Houri Yafin, Jerusalem (IL); Sarah Levy, Jaffa (IL); Joseph Joel Pollak, Neve Daniel (IL); Daniel Levner, Brookline, MA (US); Yonatan Halperin, Tel-Aviv (IL); Natalie Lezmy, Hod Hasharon (IL); Itamar Weiss, Tel Aviv (IL)

(73) Assignee: S.D. Sight Diagnostics Ltd., Tel Aviv (IL)

( * ) Notice: Subject to any disclaimer, the term of this patent is extended or adjusted under 35 U.S.C. 154(b) by 440 days.

(21) Appl. No.: 17/770,339

(22) PCT Filed: Oct. 22, 2020

(86) PCT No.: PCT/IB2020/059924
§ 371 (c)(1),
(2) Date: Apr. 20, 2022

(87) PCT Pub. No.: WO2021/079305
PCT Pub. Date: Apr. 29, 2021

(65) Prior Publication Data
US 2022/0390372 A1 Dec. 8, 2022

Related U.S. Application Data

(60) Provisional application No. 62/924,229, filed on Oct. 22, 2019.

(51) Int. Cl.
*G06V 20/69* (2022.01)
*G01N 15/01* (2024.01)
(Continued)

(52) U.S. Cl.
CPC ..... *G01N 21/6458* (2013.01); *G01N 15/1434* (2013.01); *G01N 33/49* (2013.01);
(Continued)

(58) Field of Classification Search
CPC .......... G01N 21/6458; G01N 15/1434; G01N 33/49; G01N 33/491; G01N 2015/016;
(Continued)

(56) References Cited

U.S. PATENT DOCUMENTS

| 3,203,768 A | 8/1965 | Tiller et al. |
| 3,603,156 A | 9/1971 | Konkol |

(Continued)

FOREIGN PATENT DOCUMENTS

| CA | 2655024 C | 11/2014 |
| CN | 1918501 A | 2/2007 |

(Continued)

OTHER PUBLICATIONS

An Office Action dated Jul. 12, 2022, which issued during the prosecution of U.S. Appl. No. 16/088,321.
(Continued)

*Primary Examiner* — Tarifur R Chowdhury
*Assistant Examiner* — Joshua M Carlson
(74) *Attorney, Agent, or Firm* — Sughrue Mion, PLLC

(57) ABSTRACT

Apparatus and methods are described including preparing a blood sample for analysis by depositing the blood sample within a sample chamber (52), and placing the sample chamber, with the blood sample deposited therein, within a microscopy unit (24). One or more microscopic images of the sample chamber (52) with the blood sample deposited
(Continued)

therein are acquired, using a microscope of the microscopy unit. Based upon the one or more images, an amount of one or more cell types within the sample chamber that had already settled within the sample chamber, prior to acquisition of the one or more microscopic images is determined. A characteristic of the sample is determined, at least partially in response thereto. Other applications are also described.

7 Claims, 5 Drawing Sheets

(51) Int. Cl.
  G01N 15/14      (2024.01)
  G01N 15/1434    (2024.01)
  G01N 21/64      (2006.01)
  G01N 33/49      (2006.01)
  G06T 7/00       (2017.01)
  G06V 10/143     (2022.01)

(52) U.S. Cl.
  CPC ......... *G01N 33/491* (2013.01); *G01N 33/492* (2013.01); *G06T 7/0012* (2013.01); *G06V 10/143* (2022.01); *G06V 20/69* (2022.01); *G06V 20/698* (2022.01); *G01N 2015/016* (2024.01); *G01N 2015/018* (2024.01); *G01N 2015/1486* (2013.01); *G06T 2207/10064* (2013.01); *G06T 2207/30104* (2013.01)

(58) Field of Classification Search
  CPC ...... G01N 2015/018; G01N 2015/1486; G06T 7/0012; G06T 2207/30104; G06V 20/698
  USPC .......................................................... 356/39
  See application file for complete search history.

(56) References Cited

U.S. PATENT DOCUMENTS

| | | |
|---|---|---|
| 3,676,076 A | 7/1972 | Grady |
| 3,786,184 A | 1/1974 | Pieters |
| 3,916,205 A | 10/1975 | Kleinerman |
| 3,967,056 A | 6/1976 | Yata et al. |
| 4,030,888 A | 6/1977 | Yamamoto |
| 4,076,419 A | 2/1978 | Kleker |
| 4,097,845 A | 6/1978 | Bacus |
| 4,199,748 A | 4/1980 | Bacus |
| 4,209,548 A | 6/1980 | Bacus |
| 4,350,884 A | 9/1982 | Vollath |
| 4,453,266 A | 6/1984 | Bacus |
| 4,454,235 A | 6/1984 | Johnson |
| 4,494,479 A | 1/1985 | Drury et al. |
| 4,580,895 A | 4/1986 | Patel |
| 4,700,298 A | 10/1987 | Palcic et al. |
| 4,761,381 A | 8/1988 | Blatt et al. |
| 4,774,192 A | 9/1988 | Terminiello et al. |
| 4,803,352 A | 2/1989 | Bierleutgeb |
| 4,851,330 A | 7/1989 | Kohne |
| 4,902,101 A | 2/1990 | Fujihara et al. |
| 5,001,067 A | 3/1991 | Coleman et al. |
| 5,064,282 A | 11/1991 | Curtis |
| 5,229,265 A | 7/1993 | Tometsko |
| 5,281,517 A * | 1/1994 | Bacus ................ G01N 15/1468 436/805 |
| 5,300,779 A | 4/1994 | Hillman et al. |
| 5,331,958 A | 7/1994 | Oppenheimer |
| 5,376,790 A | 12/1994 | Linker |
| 5,430,542 A | 7/1995 | Shepherd et al. |
| 5,470,751 A | 11/1995 | Sakata et al. |
| 5,499,097 A | 3/1996 | Ortyn et al. |
| 5,566,249 A | 10/1996 | Rosenlof et al. |
| 5,625,706 A | 4/1997 | Lee et al. |
| 5,663,057 A | 9/1997 | Drocourt et al. |
| 5,671,288 A | 9/1997 | Wilhelm et al. |
| 5,672,861 A | 9/1997 | Fairley et al. |
| 5,674,457 A | 10/1997 | Williamsson et al. |
| 5,745,804 A | 4/1998 | Iwane |
| 5,782,770 A | 7/1998 | Mooradian et al. |
| 5,784,162 A | 7/1998 | Cabib |
| 5,827,190 A | 10/1998 | Palcic et al. |
| 5,834,217 A | 11/1998 | Levine et al. |
| 5,932,872 A | 8/1999 | Price |
| 5,939,709 A | 8/1999 | Ghislain |
| 5,948,686 A | 9/1999 | Wardlaw et al. |
| 5,978,497 A | 11/1999 | Lee et al. |
| 5,985,595 A | 11/1999 | Krider et al. |
| 5,993,702 A | 11/1999 | Davis |
| 6,005,964 A | 12/1999 | Reid et al. |
| 6,027,695 A | 2/2000 | Oldenburg et al. |
| 6,064,474 A | 5/2000 | Lee |
| 6,074,879 A | 6/2000 | Zelmanovic |
| 6,101,404 A | 8/2000 | Yoon |
| 6,235,536 B1 | 5/2001 | Wardlaw |
| 6,262,798 B1 | 7/2001 | Shepherd et al. |
| 6,320,979 B1 | 11/2001 | Melen |
| 6,330,348 B1 | 12/2001 | Kerschmann et al. |
| 6,339,472 B1 | 1/2002 | Hafeman |
| 6,350,613 B1 | 2/2002 | Wardlaw et al. |
| 6,448,024 B1 | 9/2002 | Bruegger |
| 6,519,355 B2 | 2/2003 | Nelson |
| 6,554,788 B1 | 4/2003 | Hunley et al. |
| 6,582,964 B1 | 6/2003 | Samsoondar et al. |
| 6,611,777 B2 | 8/2003 | Samsoondar |
| 6,632,681 B1 | 10/2003 | Chu |
| 6,658,143 B2 | 12/2003 | Hansen |
| 6,664,528 B1 | 12/2003 | Cartlidge et al. |
| 6,711,516 B2 | 3/2004 | Samsoondar |
| 6,799,119 B1 | 9/2004 | Voorhees et al. |
| 6,819,408 B1 | 11/2004 | Scrivens et al. |
| 6,831,733 B2 | 12/2004 | Pettersson |
| 6,834,237 B2 | 12/2004 | Noergaard et al. |
| 6,836,559 B2 | 12/2004 | Abdel-fattah |
| 6,842,233 B2 | 1/2005 | Narisada |
| 6,866,823 B2 | 3/2005 | Wardlaw |
| 6,872,930 B2 | 3/2005 | Cartlidge et al. |
| 6,898,451 B2 | 5/2005 | Wuori |
| 6,903,323 B2 | 6/2005 | Cartlidge et al. |
| 6,929,953 B1 | 8/2005 | Wardlaw et al. |
| 6,949,384 B2 | 9/2005 | Samsoondar |
| 6,955,872 B2 | 10/2005 | Maples et al. |
| 6,956,650 B2 | 10/2005 | Boas |
| 6,989,891 B2 | 1/2006 | Braig et al. |
| 7,027,628 B1 | 4/2006 | Gagnon |
| 7,030,351 B2 | 4/2006 | Wasserman |
| 7,034,883 B1 | 4/2006 | Rosenqvist |
| 7,105,795 B2 | 9/2006 | Cartlidge et al. |
| 7,132,636 B1 | 11/2006 | Cartlidge |
| 7,133,547 B2 | 11/2006 | Marcelpoil |
| 7,151,246 B2 | 12/2006 | Fein et al. |
| 7,155,049 B2 | 12/2006 | Wetzel |
| 7,248,716 B2 | 7/2007 | Fein et al. |
| 7,274,810 B2 | 9/2007 | Reeves et al. |
| 7,283,217 B2 | 10/2007 | Ikeuchi |
| 7,288,751 B2 | 10/2007 | Cartlidge et al. |
| 7,305,109 B1 | 12/2007 | Gagnon |
| 7,324,694 B2 | 1/2008 | Chapoulaud |
| 7,329,537 B2 | 2/2008 | Qiu |
| 7,338,168 B2 | 3/2008 | Cartlidge et al. |
| 7,344,890 B2 | 3/2008 | Perez et al. |
| 7,346,205 B2 | 3/2008 | Walker, Jr. |
| 7,369,696 B2 | 5/2008 | Arini et al. |
| 7,385,168 B2 | 6/2008 | Cartlidge et al. |
| 7,387,898 B1 | 6/2008 | Gordon |
| 7,411,680 B2 | 8/2008 | Chang |
| 7,417,213 B2 | 8/2008 | Krief et al. |
| 7,425,421 B2 | 9/2008 | Dertinger |
| 7,439,478 B2 | 10/2008 | Cartlidge et al. |
| 7,450,223 B2 | 11/2008 | Ikeuchi |
| 7,450,762 B2 | 11/2008 | Morell |
| 7,460,222 B2 | 12/2008 | Kalveram |
| 7,490,085 B2 | 2/2009 | Walker et al. |
| 7,493,219 B1 | 2/2009 | Qi |
| 7,580,120 B2 | 8/2009 | Hamada |

(56) References Cited

U.S. PATENT DOCUMENTS

| | | |
|---|---|---|
| 7,599,893 B2 | 10/2009 | Sapir |
| 7,601,938 B2 | 10/2009 | Cartlidge et al. |
| 7,602,954 B2 | 10/2009 | Marcelpoil |
| 7,605,356 B2 | 10/2009 | Krief |
| 7,609,369 B2 | 10/2009 | Simon-Lopez |
| 7,630,063 B2 | 12/2009 | Padmanabhan |
| 7,633,604 B2 | 12/2009 | Ikeuchi |
| 7,638,748 B2 | 12/2009 | Krief et al. |
| 7,663,738 B2 | 2/2010 | Johansson |
| 7,668,362 B2 | 2/2010 | Olson |
| 7,692,131 B2 | 4/2010 | Fein et al. |
| 7,697,764 B2 | 4/2010 | Kataoka |
| 7,702,181 B2 | 4/2010 | Gouch |
| 7,706,862 B2 | 4/2010 | Alfano et al. |
| 7,713,474 B2 | 5/2010 | Schulman et al. |
| 7,747,153 B2 | 6/2010 | Ibaraki |
| 7,765,069 B2 | 7/2010 | Ostoich |
| 7,777,869 B2 | 8/2010 | Nerin |
| 7,787,109 B2 | 8/2010 | Dosmann et al. |
| 7,796,797 B2 | 9/2010 | Nakaya et al. |
| 7,863,552 B2 | 1/2011 | Cartlidge et al. |
| 7,869,009 B2 | 1/2011 | Dosmann et al. |
| 7,894,047 B2 | 2/2011 | Hamada |
| 7,911,617 B2 | 3/2011 | Padmanabhan |
| 7,925,070 B2 | 4/2011 | Sumida |
| 7,929,121 B2 | 4/2011 | Wardlaw |
| 7,933,435 B2 | 4/2011 | Hunter |
| 7,936,913 B2 | 5/2011 | Nordell |
| 7,951,599 B2 | 5/2011 | Levine |
| 7,995,200 B2 | 8/2011 | Matsumoto |
| 7,998,435 B2 | 8/2011 | Reed |
| 8,000,511 B2 | 8/2011 | Perz |
| 8,044,974 B2 | 10/2011 | Sumida |
| 8,045,782 B2 | 10/2011 | Li |
| 8,055,471 B2 | 11/2011 | Qi |
| 8,064,680 B2 | 11/2011 | Ramoser |
| 8,077,296 B2 | 12/2011 | Wardlaw |
| 8,081,303 B2 | 12/2011 | Levine |
| 8,105,554 B2 | 1/2012 | Kanigan et al. |
| 8,125,643 B2 | 2/2012 | Hansen |
| D655,421 S | 3/2012 | Lee et al. |
| 8,131,035 B2 | 3/2012 | Grady |
| 8,131,052 B2 | 3/2012 | Alexandrov |
| 8,150,114 B2 | 4/2012 | Svanberg |
| 8,154,713 B2 | 4/2012 | Simon-Lopez |
| 8,165,385 B2 | 4/2012 | Reeves |
| 8,175,353 B2 | 5/2012 | Westphal |
| 8,179,597 B2 | 5/2012 | Namba |
| 8,184,273 B2 | 5/2012 | Dosmann |
| 8,192,995 B2 | 6/2012 | Zhang et al. |
| 8,216,832 B2 | 7/2012 | Battrell et al. |
| 8,224,058 B2 | 7/2012 | Lindberg |
| 8,269,954 B2 | 9/2012 | Levine |
| 8,280,134 B2 | 10/2012 | Hoyt |
| 8,310,659 B2 | 11/2012 | Wardlaw |
| 8,320,655 B2 | 11/2012 | Sarachan |
| 8,327,724 B2 | 12/2012 | Fairs |
| 8,331,642 B2 | 12/2012 | Zerfass |
| 8,339,586 B2 | 12/2012 | Zahniser |
| 8,345,227 B2 | 1/2013 | Zahniser |
| 8,351,676 B2 | 1/2013 | Dai |
| 8,363,221 B2 | 1/2013 | Hansen |
| 8,379,944 B2 | 2/2013 | Grady |
| 8,406,498 B2 | 3/2013 | Ortyn |
| 8,428,331 B2 | 4/2013 | Dimarzio |
| 8,432,392 B2 | 4/2013 | Kim |
| 8,477,294 B2 | 7/2013 | Zahniser |
| 8,481,303 B2 | 7/2013 | Faris et al. |
| 8,488,111 B2 | 7/2013 | Zahniser |
| 8,491,499 B2 | 7/2013 | Choi et al. |
| 8,526,704 B2 | 9/2013 | Dobbe |
| 8,570,496 B2 | 10/2013 | Chen |
| 8,582,924 B2 | 11/2013 | De La Torre-bueno |
| 8,638,427 B2 | 1/2014 | Wardlaw |
| 8,712,142 B2 | 4/2014 | Rajpoot |
| 8,736,824 B2 | 5/2014 | Matsui |
| 8,744,165 B2 | 6/2014 | Liu |
| 8,778,687 B2 | 7/2014 | Levine |
| 8,787,650 B2 | 7/2014 | Marugame |
| 8,792,693 B2 | 7/2014 | Satish |
| 8,837,803 B2 | 9/2014 | Wang et al. |
| 8,849,024 B2 | 9/2014 | Shinoda |
| 8,873,827 B2 | 10/2014 | Mcculloch |
| 8,877,458 B2 | 11/2014 | Maurer |
| 8,878,923 B2 | 11/2014 | Henderson |
| 8,885,154 B2 | 11/2014 | Wardlaw |
| 8,885,912 B2 | 11/2014 | Sui |
| 8,891,851 B2 | 11/2014 | Spaulding |
| 8,922,761 B2 | 12/2014 | Zahniser |
| 8,942,458 B2 | 1/2015 | Takahashi |
| 8,964,171 B2 | 2/2015 | Zahniser |
| 8,992,750 B1 | 3/2015 | Beaty |
| 8,994,930 B2 | 3/2015 | Levine |
| 9,012,868 B2 | 4/2015 | Courtney et al. |
| 9,041,792 B2 | 5/2015 | Van Leeuwen |
| 9,046,473 B2 | 6/2015 | Levine |
| 9,050,595 B2 | 6/2015 | Miller et al. |
| 9,064,301 B2 | 6/2015 | Zie et al. |
| 9,176,121 B2 | 11/2015 | Winkelman et al. |
| 9,186,843 B2 | 11/2015 | Chan et al. |
| 9,240,043 B2 | 1/2016 | Christiansen |
| 9,322,767 B2 | 4/2016 | Ehrenkranz |
| 9,329,129 B2 | 5/2016 | Pollak et al. |
| 9,342,734 B2 | 5/2016 | Lin et al. |
| 9,404,852 B2 | 8/2016 | Braig et al. |
| 9,470,609 B2 | 10/2016 | Wimberger-friedl |
| 9,477,875 B2 | 10/2016 | Ohya |
| 9,522,396 B2 | 12/2016 | Bachelet |
| 9,528,978 B2 | 12/2016 | Yamada |
| 9,588,033 B2 | 3/2017 | Zahniser et al. |
| 9,767,343 B1 | 9/2017 | Jones et al. |
| 9,820,990 B2 | 11/2017 | Pak et al. |
| 9,933,363 B2 | 4/2018 | Danuser et al. |
| 9,934,571 B2 | 4/2018 | Ozaki |
| 9,976,945 B2 | 5/2018 | Kendall et al. |
| 10,024,858 B2 | 7/2018 | Smith et al. |
| 10,061,972 B2 | 8/2018 | Champlin |
| 10,093,957 B2 | 10/2018 | Pollak et al. |
| 10,169,861 B2 | 1/2019 | Ozaki et al. |
| 10,176,565 B2 | 1/2019 | Greenfield |
| 10,217,219 B2 | 2/2019 | Rimm |
| 10,281,386 B2 | 5/2019 | Hsu et al. |
| 10,395,368 B2 | 8/2019 | Berezhna |
| 10,482,595 B2 | 11/2019 | Yorav-Raphael |
| 10,488,644 B2 | 11/2019 | Eshel |
| 10,508,983 B2 | 12/2019 | Kendall et al. |
| 10,527,635 B1 | 1/2020 | Bhatia |
| 10,640,807 B2 | 5/2020 | Pollak |
| 10,663,712 B2 | 5/2020 | Eshel |
| 10,843,190 B2 | 11/2020 | Bachelet |
| 11,099,175 B2 | 8/2021 | Zait et al. |
| 11,199,690 B2 | 12/2021 | Eshel |
| 11,609,413 B2 | 3/2023 | Yorav-Raphael et al. |
| 2002/0009711 A1 | 1/2002 | Wada et al. |
| 2002/0028158 A1 | 3/2002 | Wardlaw et al. |
| 2002/0028471 A1 | 3/2002 | Oberhardt |
| 2003/0017085 A1 | 1/2003 | Kercso et al. |
| 2003/0161514 A1 | 8/2003 | Curry |
| 2003/0170613 A1 | 9/2003 | Straus |
| 2003/0197925 A1 | 10/2003 | Hamborg |
| 2003/0208140 A1 | 11/2003 | Pugh |
| 2003/0224522 A1 | 12/2003 | de Jong |
| 2003/0227612 A1 | 12/2003 | Fein et al. |
| 2003/0227673 A1 | 12/2003 | Nakagawa |
| 2003/0231791 A1 | 12/2003 | Torre-Bueno et al. |
| 2004/0054283 A1 | 3/2004 | Corey et al. |
| 2004/0122216 A1 | 6/2004 | Nielsen |
| 2004/0132171 A1 | 7/2004 | Rule et al. |
| 2004/0170312 A1 | 9/2004 | Soenksen |
| 2004/0185447 A1 | 9/2004 | Maples et al. |
| 2004/0218804 A1 | 11/2004 | Affleck et al. |
| 2004/0240050 A1 | 12/2004 | Ogihara |
| 2004/0241677 A1 | 12/2004 | Lin et al. |
| 2005/0089208 A1 | 4/2005 | Dong et al. |

(56) References Cited

U.S. PATENT DOCUMENTS

| | | |
|---|---|---|
| 2005/0109959 A1 | 5/2005 | Wasserman et al. |
| 2005/0117204 A1 | 6/2005 | Kinoshita |
| 2005/0175992 A1 | 8/2005 | Aberl et al. |
| 2005/0286800 A1 | 12/2005 | Gouch |
| 2006/0002817 A1 | 1/2006 | Bohm et al. |
| 2006/0003458 A1 | 1/2006 | Golovchenko et al. |
| 2006/0045505 A1 | 3/2006 | Zeineh |
| 2006/0051778 A1 | 3/2006 | Kallick |
| 2006/0063185 A1 | 3/2006 | Vannier |
| 2006/0079144 A1 | 4/2006 | Klisch et al. |
| 2006/0187442 A1 | 8/2006 | Chang et al. |
| 2006/0190226 A1 | 8/2006 | Jojic et al. |
| 2006/0222567 A1 | 10/2006 | Kloepfer et al. |
| 2006/0223052 A1 | 10/2006 | MacDonald et al. |
| 2006/0223165 A1 | 10/2006 | Chang et al. |
| 2006/0244964 A1 | 11/2006 | Cox |
| 2007/0054350 A1 | 3/2007 | Walker |
| 2007/0076190 A1 | 4/2007 | Nakaya et al. |
| 2007/0161075 A1 | 7/2007 | Gleich |
| 2007/0172956 A1 | 7/2007 | Magari et al. |
| 2007/0231914 A1 | 10/2007 | Deng et al. |
| 2007/0243117 A1 | 10/2007 | Wardlaw et al. |
| 2007/0250301 A1 | 10/2007 | Vaisberg et al. |
| 2007/0252984 A1 | 11/2007 | Van Beek et al. |
| 2008/0002868 A1 | 1/2008 | Ando |
| 2008/0019584 A1 | 1/2008 | Lindberg et al. |
| 2008/0020128 A1 | 1/2008 | van Ryper |
| 2008/0059135 A1 | 3/2008 | Murugkar et al. |
| 2008/0118399 A1 | 5/2008 | Fleming |
| 2008/0153098 A1 | 6/2008 | Rimm |
| 2008/0187466 A1 | 8/2008 | Wardlaw et al. |
| 2008/0212069 A1 | 9/2008 | Goldberg et al. |
| 2008/0260369 A1 | 10/2008 | Ibaraki |
| 2008/0273776 A1 | 11/2008 | Krief et al. |
| 2008/0305514 A1 | 12/2008 | Alford et al. |
| 2009/0066934 A1 | 3/2009 | Gao et al. |
| 2009/0074282 A1 | 3/2009 | Pinard et al. |
| 2009/0075324 A1 | 3/2009 | Pettersson |
| 2009/0086314 A1 | 4/2009 | Namba |
| 2009/0088336 A1 | 4/2009 | Burd et al. |
| 2009/0128618 A1 | 5/2009 | Fahn et al. |
| 2009/0185734 A1 | 7/2009 | Lindberg et al. |
| 2009/0191098 A1 | 7/2009 | Beard et al. |
| 2009/0195688 A1 | 8/2009 | Henderson et al. |
| 2009/0197272 A1 | 8/2009 | Hendriks |
| 2009/0213214 A1 | 8/2009 | Yamada |
| 2009/0238438 A1 | 9/2009 | Wardlaw |
| 2009/0258347 A1 | 10/2009 | Scott |
| 2009/0269799 A1 | 10/2009 | Winkelman et al. |
| 2009/0291854 A1 | 11/2009 | Wiesinger-Mayr et al. |
| 2010/0003265 A1 | 1/2010 | Scheffler et al. |
| 2010/0068747 A1 | 3/2010 | Herrenknecht |
| 2010/0104169 A1 | 4/2010 | Yamada |
| 2010/0112631 A1 | 5/2010 | Hur et al. |
| 2010/0120129 A1 | 5/2010 | Amshey et al. |
| 2010/0136556 A1 | 6/2010 | Friedberger et al. |
| 2010/0136570 A1 | 6/2010 | Goldberg et al. |
| 2010/0152054 A1 | 6/2010 | Love |
| 2010/0157086 A1 | 6/2010 | Segale et al. |
| 2010/0172020 A1 | 7/2010 | Price |
| 2010/0192706 A1 | 8/2010 | Fairs |
| 2010/0232675 A1 | 9/2010 | Ortyn et al. |
| 2010/0234703 A1 | 9/2010 | Sterling et al. |
| 2010/0253907 A1 | 10/2010 | Korb |
| 2010/0254596 A1 | 10/2010 | Xiong |
| 2010/0256918 A1 | 10/2010 | Chen et al. |
| 2010/0265323 A1 | 10/2010 | Perz |
| 2010/0272334 A1 | 10/2010 | Yamada et al. |
| 2010/0295998 A1 | 11/2010 | Sakai et al. |
| 2010/0300563 A1 | 12/2010 | Ramunas et al. |
| 2011/0007178 A1 | 1/2011 | Kahlman |
| 2011/0009163 A1 | 1/2011 | Fletcher |
| 2011/0030458 A1 | 2/2011 | Park et al. |
| 2011/0059481 A1 | 3/2011 | Wardlaw et al. |
| 2011/0102571 A1 | 5/2011 | Yoneyama |
| 2011/0123398 A1 | 5/2011 | Carrhilo et al. |
| 2011/0144480 A1 | 6/2011 | Lu et al. |
| 2011/0149097 A1 | 6/2011 | Danuser et al. |
| 2011/0151502 A1 | 6/2011 | Kendall et al. |
| 2011/0178716 A1 | 7/2011 | Krockenberger et al. |
| 2011/0212486 A1 | 9/2011 | Yamada |
| 2011/0243794 A1 | 10/2011 | Wardlaw |
| 2011/0249910 A1 | 10/2011 | Henderson |
| 2011/0275111 A1 | 11/2011 | Pettigrew et al. |
| 2011/0301012 A1 | 12/2011 | Dolecek et al. |
| 2012/0002195 A1 | 1/2012 | Wu et al. |
| 2012/0013727 A1 | 1/2012 | Breniman |
| 2012/0021951 A1 | 1/2012 | Hess et al. |
| 2012/0030618 A1 | 2/2012 | Leong et al. |
| 2012/0044342 A1 | 2/2012 | Hing et al. |
| 2012/0058504 A1 | 3/2012 | Li et al. |
| 2012/0092477 A1 | 4/2012 | Kawano et al. |
| 2012/0120221 A1 | 5/2012 | Dong et al. |
| 2012/0169863 A1 | 7/2012 | Bachelet et al. |
| 2012/0225446 A1 | 9/2012 | Wimberger-friedl et al. |
| 2012/0237107 A1 | 9/2012 | Tawfik et al. |
| 2012/0275671 A1 | 11/2012 | Eichhorn et al. |
| 2012/0312957 A1 | 12/2012 | Loney et al. |
| 2012/0320045 A1 | 12/2012 | Yao |
| 2013/0023007 A1 | 1/2013 | Zahniser et al. |
| 2013/0078668 A1 | 3/2013 | Levine et al. |
| 2013/0130262 A1 | 5/2013 | Battrell et al. |
| 2013/0169948 A1 | 7/2013 | Xie et al. |
| 2013/0170730 A1 | 7/2013 | Yu et al. |
| 2013/0176551 A1 | 7/2013 | Wardlaw et al. |
| 2013/0177974 A1 | 7/2013 | Mamghani et al. |
| 2013/0203082 A1 | 8/2013 | Gonda et al. |
| 2013/0236566 A1 | 9/2013 | Higgins |
| 2013/0273968 A1 | 10/2013 | Rhoads et al. |
| 2013/0284924 A1 | 10/2013 | Mizuochi et al. |
| 2013/0290225 A1 | 10/2013 | Kamath et al. |
| 2013/0315466 A1 | 11/2013 | Drell |
| 2013/0323757 A1 | 12/2013 | Poher |
| 2014/0139625 A1 | 5/2014 | Mathuis et al. |
| 2014/0139630 A1 | 5/2014 | Kowalevicz |
| 2014/0185906 A1 | 7/2014 | Ding et al. |
| 2014/0186859 A1 | 7/2014 | Calderwood et al. |
| 2014/0205176 A1 | 7/2014 | Obrien et al. |
| 2014/0270425 A1 | 9/2014 | Kenny et al. |
| 2014/0273064 A1 | 9/2014 | Smith et al. |
| 2014/0273076 A1 | 9/2014 | Adams |
| 2014/0322750 A1 | 10/2014 | Matsumoto |
| 2014/0347459 A1 | 11/2014 | Greenfield et al. |
| 2014/0347463 A1 | 11/2014 | Lin |
| 2014/0353524 A1 | 12/2014 | Danuser et al. |
| 2014/0369586 A1 | 12/2014 | Rimm |
| 2015/0022882 A1 | 1/2015 | Ue |
| 2015/0029508 A1 | 1/2015 | Toyoda |
| 2015/0037806 A1 | 2/2015 | Pollak et al. |
| 2015/0050643 A1 | 2/2015 | Matsumoto |
| 2015/0124082 A1 | 5/2015 | Kato et al. |
| 2015/0183153 A1 | 7/2015 | Chan et al. |
| 2015/0190063 A1 | 7/2015 | Zakharov et al. |
| 2015/0246170 A1 | 9/2015 | Miao et al. |
| 2015/0278575 A1 | 10/2015 | Allano et al. |
| 2015/0302237 A1 | 10/2015 | Ohya et al. |
| 2015/0316477 A1* | 11/2015 | Pollak ................. C12Q 1/04 435/40.51 |
| 2016/0042507 A1 | 2/2016 | Turner |
| 2016/0091484 A1 | 3/2016 | Yamada |
| 2016/0146750 A1 | 5/2016 | Hughes et al. |
| 2016/0168614 A1 | 6/2016 | Hunt |
| 2016/0187235 A1 | 6/2016 | Fine |
| 2016/0208306 A1 | 7/2016 | Pollak et al. |
| 2016/0246046 A1 | 8/2016 | Yorav-Raphael et al. |
| 2016/0250312 A1 | 9/2016 | Longley |
| 2016/0279633 A1 | 9/2016 | Bachelet et al. |
| 2017/0003490 A1 | 1/2017 | Sueki |
| 2017/0052110 A1 | 2/2017 | Malissek et al. |
| 2017/0115271 A1 | 4/2017 | Xie et al. |
| 2017/0146558 A1 | 5/2017 | Ishii |
| 2017/0160185 A1 | 6/2017 | Minemura et al. |
| 2017/0191945 A1 | 7/2017 | Zhang et al. |
| 2017/0205612 A1 | 7/2017 | Carloni |

(56) References Cited

U.S. PATENT DOCUMENTS

| | | | |
|---|---|---|---|
| 2017/0218425 A1 | 8/2017 | Chen et al. | |
| 2017/0292905 A1 | 10/2017 | Obrien et al. | |
| 2017/0307496 A1 | 10/2017 | Zahniser et al. | |
| 2017/0326549 A1 | 11/2017 | Jones et al. | |
| 2017/0328924 A1 | 11/2017 | Jones et al. | |
| 2018/0080885 A1 | 3/2018 | Ginsberg | |
| 2018/0156713 A1* | 6/2018 | Berezhna | G02B 7/365 |
| 2018/0171404 A1 | 6/2018 | Del Favero | |
| 2018/0172578 A1 | 6/2018 | Fiolka | |
| 2018/0246313 A1 | 8/2018 | Eshel et al. | |
| 2018/0259318 A1 | 9/2018 | Yelin et al. | |
| 2018/0296102 A1 | 10/2018 | Satish et al. | |
| 2018/0297024 A1 | 10/2018 | Tran | |
| 2019/0002950 A1 | 1/2019 | Pollak et al. | |
| 2019/0087953 A1 | 3/2019 | Yorav-Raphael | |
| 2019/0110718 A1 | 4/2019 | Brittenham | |
| 2019/0130567 A1 | 5/2019 | Greenfield | |
| 2019/0145963 A1 | 5/2019 | Zait | |
| 2019/0266723 A1* | 8/2019 | Blanchard | G06V 20/698 |
| 2019/0302099 A1 | 10/2019 | Pollak | |
| 2019/0324255 A1 | 10/2019 | Pergande | |
| 2019/0347467 A1 | 11/2019 | Ohsaka et al. | |
| 2020/0034967 A1 | 1/2020 | Yorav-Raphael | |
| 2020/0049970 A1 | 2/2020 | Eshel | |
| 2020/0111209 A1 | 4/2020 | Greenfield | |
| 2020/0249458 A1 | 8/2020 | Eshel | |
| 2020/0300750 A1 | 9/2020 | Eshel et al. | |
| 2021/0069696 A1* | 3/2021 | Li | G01N 21/6452 |
| 2022/0189016 A1 | 6/2022 | Barnes et al. | |

FOREIGN PATENT DOCUMENTS

| | | |
|---|---|---|
| CN | 101403650 A | 4/2009 |
| CN | 101438143 A | 5/2009 |
| CN | 101501785 A | 8/2009 |
| CN | 102027368 A | 4/2011 |
| CN | 102282467 A | 12/2011 |
| CN | 102933964 A | 2/2013 |
| CN | 104094118 A | 10/2014 |
| CN | 104471389 A | 3/2015 |
| CN | 105467109 A | 4/2016 |
| CN | 105556276 A | 5/2016 |
| CN | 108474934 A | 8/2018 |
| EP | 0073551 A2 | 3/1983 |
| EP | 0479231 A1 | 4/1992 |
| EP | 0744191 A2 | 11/1996 |
| EP | 1 381 229 A1 | 1/2004 |
| EP | 1698883 A1 | 9/2006 |
| EP | 2145684 A2 | 1/2010 |
| EP | 2 211 165 A2 | 7/2010 |
| EP | 3001174 A1 | 3/2016 |
| EP | 3123927 | 2/2017 |
| EP | 3482189 A1 | 5/2019 |
| EP | 1 873 232 B1 | 2/2020 |
| GB | 2329014 A | 3/1999 |
| JP | 60-162955 A | 8/1985 |
| JP | 61-198204 A | 9/1986 |
| JP | 7-504038 A | 4/1995 |
| JP | H08-313340 A | 11/1996 |
| JP | 9-54083 A | 2/1997 |
| JP | 11-500832 A | 1/1999 |
| JP | H11-73903 A | 3/1999 |
| JP | 2000-199845 A | 7/2000 |
| JP | 2002-516982 A | 6/2002 |
| JP | 2004-144526 A | 5/2004 |
| JP | 2004-257768 A | 9/2004 |
| JP | 2004-532410 A | 10/2004 |
| JP | 2005-218379 A | 8/2005 |
| JP | 2006-506607 A | 2/2006 |
| JP | 2006-301270 A | 11/2006 |
| JP | 2007-40814 A | 2/2007 |
| JP | 2008-5768 A | 1/2008 |
| JP | 2008-20498 A | 1/2008 |
| JP | 2009-180539 A | 8/2009 |
| JP | 2009-233927 A | 10/2009 |
| JP | 2009-268432 A | 11/2009 |
| JP | 2011-95225 A | 5/2011 |
| JP | 2013-27368 A | 2/2013 |
| JP | 2013-515264 A | 5/2013 |
| JP | 2013-517460 A | 5/2013 |
| JP | 2013-541767 A | 11/2013 |
| JP | 2014-41139 A | 3/2014 |
| JP | 2014-44050 A | 3/2014 |
| JP | 2015-21938 A | 2/2015 |
| JP | 2015-57600 A | 3/2015 |
| JP | 2016-70658 A | 5/2016 |
| JP | 2016-71588 A | 5/2016 |
| JP | 2016-528506 A | 9/2016 |
| JP | 2016-189701 A | 11/2016 |
| JP | 2017-67524 A | 4/2017 |
| JP | 2017-209530 A | 11/2017 |
| JP | 2018-525611 A | 9/2018 |
| JP | 2018-534605 A | 11/2018 |
| JP | 2019-528459 A | 10/2019 |
| JP | 6952683 B2 | 10/2021 |
| RU | 2289133 C1 | 12/2006 |
| RU | 2402006 C1 | 10/2010 |
| WO | 1985/005446 | 12/1985 |
| WO | 1996/001438 | 1/1996 |
| WO | 1996/012981 | 5/1996 |
| WO | 1996/013615 | 5/1996 |
| WO | 2000/006765 | 2/2000 |
| WO | 2000/052195 | 9/2000 |
| WO | 2000/055572 | 9/2000 |
| WO | 2003/056327 | 7/2003 |
| WO | 2003/065358 A2 | 8/2003 |
| WO | 2003/073365 | 9/2003 |
| WO | 2003/081525 | 10/2003 |
| WO | 2004/020112 A1 | 3/2004 |
| WO | 2004/111610 | 12/2004 |
| WO | 2005/121863 | 12/2005 |
| WO | 2006/121266 | 11/2006 |
| WO | 2008/063135 | 5/2008 |
| WO | 2009/136570 A1 | 11/2009 |
| WO | 2009/136573 A1 | 11/2009 |
| WO | 2010/036827 A1 | 4/2010 |
| WO | 2010/056740 | 5/2010 |
| WO | 2010/116341 | 10/2010 |
| WO | 2010/126903 | 11/2010 |
| WO | 2010/137543 A1 | 12/2010 |
| WO | 2011/056658 A1 | 5/2011 |
| WO | 2011/076413 | 6/2011 |
| WO | 2011/123070 | 10/2011 |
| WO | 2011/143075 | 11/2011 |
| WO | 2012/000102 | 1/2012 |
| WO | 2012/029269 | 3/2012 |
| WO | 2012/030313 | 3/2012 |
| WO | 2012/090198 | 7/2012 |
| WO | 2012/154333 | 11/2012 |
| WO | 2013/041951 | 3/2013 |
| WO | 2013/098821 | 7/2013 |
| WO | 2013/102076 A1 | 7/2013 |
| WO | 2014/146063 A2 | 9/2014 |
| WO | 2014/159620 | 10/2014 |
| WO | 2014/188405 | 11/2014 |
| WO | 2015/001553 | 1/2015 |
| WO | 2015/029032 | 3/2015 |
| WO | 2015/089632 | 6/2015 |
| WO | 2016/021311 A1 | 2/2016 |
| WO | 2016/030897 | 3/2016 |
| WO | 2016/203320 A2 | 12/2016 |
| WO | 2017/046799 | 3/2017 |
| WO | 2017/168411 | 10/2017 |
| WO | 2017/195205 | 11/2017 |
| WO | 2017/195208 | 11/2017 |
| WO | 2018/009920 | 1/2018 |
| WO | 2018/102748 A1 | 6/2018 |
| WO | 2019/035084 | 2/2019 |
| WO | 2019/097387 | 5/2019 |
| WO | 2019/102277 | 5/2019 |
| WO | 2019/198094 | 10/2019 |
| WO | 2021/079305 | 4/2021 |

(56) References Cited

FOREIGN PATENT DOCUMENTS

| WO | 2021/079306 | | 4/2021 |
|---|---|---|---|
| WO | 2021/116962 | A1 | 6/2021 |
| WO | 2022/009104 | A2 | 1/2022 |

OTHER PUBLICATIONS

An Office Action dated Aug. 2, 2022, which issued during the prosecution of Japanese Patent Application No. 2021-145455.
An Examination Report dated Aug. 25, 2022, which issued during the prosecution of Australian Patent Application No. 2017263807.
An Office Action dated Aug. 30, 2022 which issued during the prosecution of Japanese Patent Application No. 2020-526176.
An Office Action dated Sep. 13, 2022 which issued during the prosecution of Japanese Patent Application No. 2021-157849.
Hideto Miura, "How to regard as how to consider the poikilocyte in urine an erroneous decision factor", Modern Medical Laboratory, Sep. 1, 2002, vol. 30, No. 9, pp. 862-864 (6 pages total).
Jun Hashimoto, "Morphological Studies of Urinary Red Blood Cells in Renal and Urinary Tract Disorders (II) Use of Wright's Stain in Differential Diagnosis between Renal and Urinary Tract Disorders" Kawasaki Medical Congress Magazine, Mar. 1989, vol. 15, No. 1, pp. 94-101 (9 pages total).
D F. Birch et al., "The research on the differential diagnosis of the kidney urinary tract obstacle by glomerular or non-glomerular", Lancet, Oct. 20, 1979, vol. 2, No. 8147, pp. 845-846 (3 pages total).
A First Examination Report dated Sep. 19, 2022, which issued during the prosecution of Indian Patent Application No. 201817040226.
An Office Action dated Oct. 3, 2022 which issued during the prosecution of U.S. Appl. No. 16/763,810.
An Office Action dated Oct. 25, 2022 which issued during the prosecution of Canadian Application No. 2,998,829.
An Office Action dated Oct. 5, 2022 which issued during the prosecution of Brazilian Application No. 112018005099-7.
An Office Action dated Nov. 25, 2022 which issued during the prosecution of Brazilian Application No. 122020017765-9.
An Office Action dated Dec. 9, 2022 which issued during the prosecution of U.S. Appl. No. 17/083,647.
An Office Action dated Dec. 28, 2022 which issued during the prosecution of Russian Patent Application No. 2022112399.
An Office Action dated Dec. 28, 2022 which issued during the prosecution of Russian Patent Application No. 2022112393.
An Office Action dated Jan. 6, 2023 which issued during the prosecution of U.S. Appl. No. 17/063,320.
An Office Action dated Sep. 2, 2022 which issued during the prosecution of U.S. Appl. No. 17/063,320.
An Office Action dated Jan. 5, 2023 which issued during the prosecution of Chinese Patent Application No. 201880079888.9.
An Examination Report dated Jan. 23, 2023, which issued during the prosecution of Australian Patent Application No. 2022200112.
An Office Action dated Jan. 19, 2023 which issued during the prosecution of U.S. Appl. No. 17/490,767.
A. K. Sawhney et al., "Erythrocyte Alterations Induced by Malathion in Channa punctatus (Bloch)", Bull. Environ. Contam. Toxicol, 2000, vol. 64, pp. 398-405 (9 pages total).
An Extended European Search Report which issued on Mar. 20, 2023 for Application No. 22209948.3.
An Office Action dated Feb. 22, 2023 which issued during the prosecution of Canadian Application No. 3,081,669.
An Office Action dated Mar. 17, 2023 which issued during the prosecution of U.S. Appl. No. 17/083,647.
An Office Action dated Mar. 2, 2023 which issued during the prosecution of Canadian Application No. 3,018,536.
An Office Action dated Mar. 27, 2023 which issued during the prosecution of Brazilian Application No. 122020017765-9.
An Office Action dated Mar. 27, 2023 which issued during the prosecution of U.S. Appl. No. 16/763,810.
An Office Action dated Mar. 3, 2022 which issued during the prosecution of U.S. Appl. No. 17/063,320.

An Office Action dated Mar. 3, 2023 which issued during the prosecution of U.S. Appl. No. 17/082,483.
An Office Action dated Mar. 7, 2023 which issued during the prosecution of Japanese Application No. JP 2021-157849.
An Office Action dated Nov. 25, 2022 which issued during the prosecution of U.S. Appl. No. 17/082,483.
Masafumi Onodera, "Organ Derangement", Medicina, Sep. 9, 2005, vol. 42, No. 9, pp. 1582-1584 (6 pages total).
Notice of Allowance issued for U.S. Appl. No. 16/088,321 on Apr. 12, 2023.
Olga V. Tyulina et al., "Erythrocyte and plasma protein modification in alcoholism: A possible role of acetaldehyde", Biochimica et Biophyisca, 2006, vol. 1762, pp. 558-563 (7 pages total).
Taihei Takakusaki, "Shape Change of Red Cell Ghost and ATP", The Kitakanto Medical Journal, 1960, vol. 10, Issue 4, pp. 522-531 (11 pages total).
Tetsuya Hirota et al., Kusanon A® Poisoning Complicated by Heinz Body Hemolytic Anemia, Japanese Association for Acute Medicine Magazine, vol. 12, No. 12, Dec. 15, 2001, pp. 749-754 (1 page total).
An Office Action dated Jun. 8, 2023 which issued during the prosecution of Canadian Application No. 3,160,692.
An Office Action dated Jun. 9, 2023 which issued during the prosecution of Canadian Application No. 3,160,688.
An Office Action dated Jun. 22, 2023 which issued during the prosecution of Canadian Application No. 3,160,697.
An Office Action mailed on Jul. 3, 2023 which issued during the prosecution of U.S. Appl. No. 17/568,858.
An Office Action dated Jul. 12, 2023 which issued during the prosecution of Canadian Application No. 3,155,820.
An Office Action dated Jul. 17, 2023 which issued during the prosecution of Canadian Application No. 3,155,821.
A Non-Final Office Action dated May 26, 2022 which issued during the prosecution of U.S. Appl. No. 17/083,775.
An Office Action dated May 31, 2022 which issued during the prosecution of U.S. Appl. No. 17/083,659.
An Office Action dated May 6, 2022 which issued during the prosecution of U.S. Appl. No. 16/763,810.
Examination Report issued by the Indian Patent Office on Jun. 28, 2022 in Indian Patent Application No. 202047019700.
Canadian Office Action dated Dec. 19, 2023 in Application No. 3,018,536.
Australian Examination Report dated Aug. 16, 2023 in Application No. 2018369859.
Canadian Office Action dated Aug. 25, 2023 in Application No. 3,160,702.
Notice of Hearing dated Nov. 9, 2023 in Indian Application No. 201817040226.
Canadian Office Action dated Dec. 7, 2023 in Application No. 3,081,669.
Canadian Office Action dated Oct. 13, 2023 in Application No. 2,998,829.
Decision to Reject dated Oct. 3, 2023 in Japanese Application No. 2021-157849.
Notice of Allowance dated Aug. 23, 2023 in U.S. Appl. No. 17/490,767.
Notice Of Allowance dated May 15, 2023 in U.S. Appl. No. 17/490,767.
Notice Of Allowance dated Oct. 12, 2023 in U.S. Appl. No. 17/568,858.
Notice Of Hearing dated Aug. 29, 2023 in Indian Application No. 201817012117.
Notice of Hearing dated Sep. 1, 2023 in Indian Application No. 201817036130.
Summons to attend oral proceeding dated Oct. 5, 2023 in European Application No. 17728277.9.
United States Office Action dated May 30, 2023 in U.S. Appl. No. 17/082,615.
United States Office Action dated Oct. 17, 2023 in U.S. Appl. No. 17/082,615.
United States Office Action dated Sep. 14, 2023 in U.S. Appl. No. 17/063,320.

(56) References Cited

OTHER PUBLICATIONS

United States Office Action dated Jan. 9, 2024 in U.S. Appl. No. 18/203,109.
United States Office Action dated Sep. 14, 2023 in U.S. Appl. No. 17/083,647.
Brazilian Office Action dated Dec. 21, 2023 in Application No. BR112018072627-3.
Notice of Allowance issued for U.S. Appl. No. 16/763,810 on Feb. 8, 2024.
United States Office Action dated Feb. 29, 2024 in U.S. Appl. No. 17/083,647.
Canadian Office Action dated Mar. 4, 2024 in Application No. 3022770.
Canadian Office Action dated Jan. 12, 2023 in Application No. 3022770.
International Search Report and Written Opinion dated Mar. 11, 2024 in Application No. PCT/IB2023/062469.
Canadian Office Action dated Mar. 6, 2024 in Application No. 3160688.
Canadian Office Action dated Mar. 11, 2024 in Application No. 3160692.
United States Office Action dated Mar. 22, 2024 in U.S. Appl. No. 17/360,503.
Canadian Office Action dated Apr. 3, 2024 in Application No. 3160697.
Canadian Office Action dated Apr. 19, 2024 in Application No. 3155820.
New Zealand Office Action dated Apr. 23, 2024 in Application No. 787743.
New Zealand Office Action dated Apr. 24, 2024 in Application No. 787745.
European Office Action dated Apr. 29, 2024 in Application No. 20800326.9.
European Office Action dated May 6, 2024 in Application No. 20 800 325.1.
United States Office Action dated May 7, 2024 in U.S. Appl. No. 17/770,339.
European Office Action dated May 8, 2024 in Application No. 20828314.3.
Kerem Delikoyun, et al., "2 Deep learning-based cellular image analysis for intelligent medical diagnosis", De Gruyter, 2021, (4 pages) https://www.degruyter.com/document/doi/10.1515/9783110668322-002/html.
C.Briggs, et al., "ICSH Guidelines for the evaluation of blood cell analysers including those used for differential leucocyte and reticulocyte counting", International Journal of Laboratory Hematology, 2014, vol. 36, pp. 613-627 (15 pages).
An Office Action dated May 16, 2024 which issued during the prosecution of U.S. Appl. No. 17/063,320.
An Office Action dated May 29, 2024 which issued during the prosecution of Korean Application No. 10-2022-7017082.
A Chinese Office Action dated May 9, 2024 which issued during the prosecution of Application No. 202080085933.9.
Notice of Allowance issued for Canadian Application No. 3,155,821 on May 21, 2024.
An Office Action dated May 29, 2024 which issued during the prosecution of Korean Application No. 10-2022-7017081.
"Blood specimens: Microscopic Examination", Centers for Disease Control and Prevention CDC, Diagnostic Procedures, 2009 <http://www.dpd.cdc.gov/dpdx/HTML/Frames/DiagnosticProcedures/body_dp_bloodexamin.htm>.
Agero, U., Mesquita, L.G., Neves, B.R.A., Gazzinelli, R.T. and Mesquita, O.N., 2004. Defocusing microscopy. Microscopy research and technique, 65(3), pp. 159-165.
Ahirwar, Neetu et al., "Advanced Image Analysis Based System for Automatic Detection and Classification of Malarial Parasite in Blood Images," International Journal of Information Technology and Knowledge Management Jan.-Jun. 2012, vol. 5, No. 1, pp. 59-64, Serial Publications Pvt. Ltd, India.

An International Preliminary Report on Patentability dated Feb. 28, 2017, which issued during the prosecution of Applicant's PCT/IL2015/050864.
An International Search Report and a Written Opinion dated Jul. 27, 2012 for International Application No. PCT/IL2011/000973.
An International Search Report and a Written Opinion both dated Apr. 18, 2013, for International Application No. PCT/IL2012/050556.
An International Search Report and a Written Opinion both dated Feb. 12, 2015, for International Application No. PCT/IL2014/050770.
An International Search Report and a Written Opinion both dated Jan. 15, 2016, for International Application No. PCT/IL2015/050864.
An International Search Report and a Written Opinion both dated Jan. 23, 2017. which issued during the prosecution of Applicant's PCT/IL2016/051025.
An International Search Report and a Written Opinion both dated Oct. 30, 2014, for International Application No. PCT/IL2014/050585.
An International Search Report and a Written Opinion both dated Sep. 29, 2014 for International Application No. PCT/IL2012/050423.
An International Search Report and Written Opinion in International Application No. PCT/IB2018/058861, issued on Apr. 8, 2019.
An International Search Report and Written Opinion, dated Aug. 30, 2017 from the International Bureau in counterpart International application No. PCT/IL2017/050526.
An International Search Report and Written Opinion, dated Aug. 8, 2017 from the International Bureau in counterpart International application No. PCT/IL2017/050523.
An International Search Report and Written Opinion, dated May 18, 2017 from the International Bureau in counterpart International application No. PCT/IL2017/050363.
An Office Action dated Apr. 2, 2015, which issued during the prosecution of U.S. Appl. No. 13/338,291.
An Office Action dated Apr. 4, 2019 which issued during the prosecution of U.S. Appl. No. 14/914,329.
An Office Action dated Aug. 4, 2017. which issued during the prosecution of U.S. Appl. No. 14/369,251.
An Office Action dated Feb. 22, 2018 which issued during the prosecution of U.S. Appl. No. 14/369,251.
An Office Action dated Jan. 10, 2018. which issued during the prosecution of U.S. Appl. No. 15/083,610.
An Office Action dated Jan. 28, 2019 which issued during the prosecution of U.S. Appl. No. 15/174,490.
An Office Action dated Jul. 11, 2017. which issued during the prosecution of U.S. Appl. No. 15/174,490.
An Office Action dated Jun. 13, 2017. which issued during the prosecution of U.S. Appl. No. 14/285,672.
An Office Action dated Jun. 15, 2018 from the United States Patent and Trademark Office in copending U.S. Appl. No. 14/369,251.
An Office Action dated Jun. 29, 2018 from the United States Patent and Trademark Office in copending U.S. Appl. No. 15/174,490.
An Office Action dated Jun. 4, 2019, which issued during the prosecution of U.S. Appl. No. 14/369,251.
An Office Action dated Jun. 5, 2019, which issued during the prosecution of U.S. Appl. No. 15/174,490.
An Office Action dated Mar. 2, 2017. which issued during the prosecution of U.S. Appl. No. 14/369,251.
An Office Action dated Nov. 16, 2018 which issued during the prosecution of U.S. Appl. No. 14/914,329.
An Office Action dated Oct. 29, 2014, which issued during the prosecution of U.S. Appl. No. 13/338,291.
An Office Action dated Oct. 5, 2016, which issued during the prosecution of U.S. Appl. No. 14/285,672.
An Office Action dated Sep. 25, 2015, which issued during the prosecution of U.S. Appl. No. 13/338,291.
An Office Action dated Dec. 21, 2018, issued by the United States Patent and Trademark Office in the prosecution of U.S. Appl. No. 14/369,251.

(56) References Cited

OTHER PUBLICATIONS

Anand, A., et al. "Automatic Identification of Malaria-Infected RBC with Digital Holographic Microscopy Using Correlation Algorithms." Photonics Journal, IEEE 4.5 (2012): 1456-1464.
Bacus, J.W., 1985. Cytometric approaches to red blood cells. Pure and Applied AL Chemistry, 57(4), pp. 593-598.
Biéler, Sylvain et al. "Improved detection of Trypanosoma brucei by lysis of red blood cells, concentration and LED fluorescence microscopy"; Acta Tropica; vol. 121, Issue 2, Feb. 2012, pp. 135-140.
Bravo-Zanoguera, M.E., Laris, C.A., Nguyen, L.K., Oliva, M. and Price, J.H., 2007. Dynamic autofocus for continuous-scanning time-delay- and-integration image acquisition in automated microscopy. Journal of biomedical optics, 12(3), pp. 034011-034011.
Brenner et al., An Automated Microscope for Cytologic Research a Preliminary Evaluation, [The Journal of Histochecmistry and Cytochemistry, vol. 24, No. 1, pp. 100-111, 1976.
Briggs, C., et al., "Continuing developments with the automated platelet count", Blackwell Publishing Ltd, International Journal of Laboratory Hematology, Jan. 18, 2007, pp. 77-91, vol. 29 (15 pages total).
Centers for Disease Control and Prevention. DPDx—Laboratory Identification of Parasitic Diseases of Public Health Concern <http://www.cdc.gov/dpdx/diagnosticProcedures/blood/microexam.html> Nov. 29, 2013.
Cervantes, Serena , Jacques Prudhomme, David Carter, Krishna G Gopi, Qian Li, Young-Tae Chang, and Karine G Le Roch, High-content live cell imaging with RNA probes: advancements in high-throughput antimalarial drug discovery, BMC Cell Biology 2009, 10:45, https://bmcmolcellbiol.biomedcentral.com/track/pdf/10.1186/1471-2121-10-45 (Jun. 10, 2009).
Chiodini, P.L. et al., "Rapid diagnosis of malaria by fluorescence microscopy"; The Lancet, vol. 337, Issue 8741, p. 624-625, Mar. 9, 1991.
Chong, Shau Poh, Shilpa Pant, and Nanguang Chen. "Line-scan Focal Modulation Microscopy for Rapid Imaging of Thick Biological Specimens." SPIE/OSA/IEEE Asia Communications and Photonics. International Society for Optics and Photonics, 2011.
Emma Eriksson et al: "Automated focusing of nuclei for time lapse experiments on single cells using holographic optical tweezers", Optics Express , vol. 17, No. 7 , Mar. 24, 2009, pp. 5585-5594.
F. Boray Tek et al. "Parasite detection and identification for automated thin blood film malaria diagnosis"; Computer Vision and Image Understanding vol. 114, Issue 1, Jan. 2010, pp. 21-32.
Fohlen-Walter, Anne PhD, et al., "Laboratory Identification of Cryoglobulinemia From Automated Blood Cell Counts, Fresh Blood Samples, and Blood Films", American Society for Clinical Pathology, Am J Clin Pathol, 2002, pp. 606-614, vol. 117 (9 pages total).
Frean, John. "Microscopic Determination of Malaria Parasite Load: Role of Image Analysis." Microscopy: Science, technology, Applications, and Education (2010): 862-866.
Gallo, V., Skorokhod, O.A., Schwarzer, e, and Arese, P. "Simultaneous determination of phagocytosis of Plasmodium falciparum-parasitized and non-parasitized red blood cells by flow cytometry"; Malaria Journal 2012 11:428.
Garcia, et al. "Laboratory Diagnosis of Blood-borne Parasitic Diseases; Approved Guideline"; NCCLS Documents M115-a, Jun. 2000.
Gordon, Andrew et al. "Single-cell quantification of molecules" Nature Methods 4, Jan. 21, 2007, pp. 175-181.
Gordon, Andrew et al. Supplementary Note to Gordon et al: "Single-cell quantification of molecules" Nature Methods, Jan. 21, 2007, pp. 1-35.
Groen, F.C.A., et al. "A comparison of different focus functions for use in autofocus algorithms", Cytometry, Alan Liss, New York, US vol. 6, No. 2, Mar. 1, 1985 (Mar. 1, 1985) pp. 81-91.
Guy, Rebecca, Paul Liu, Peter Pennefather and Ian Crandall, "The use of fluorescence enhancement to improve the microscopic diagnosis of falciparum malaria", Malaria Journal 2007 6:89, https://malariajournal.biomedcentral.com/articles/10.1186/1475-2875-6-89, (Jul. 9, 2007).
Houri-Yafin, A., et al. "An enhanced computer vision platform for clinical diagnosis of malaria" Malaria Control and Elimination, 2016, p. 138, Vo. 5, Issue 1, omics International, India.
Jager et al. "Five-minute Giemsa stain for rapid detection of malaria parasites in blood smears", Tropical Doctor, Vo. 41, pp. 33-35, Jan. 2011.
Jahanmehr,S A H et al., "Simple Technique for Fluorescence Staining of Blood Cells with Acridine Orange", Journal of Clinical Pathology, Feb. 12, 1987, pp. 926-929 (4 pages total).
Joanny, Fanny, Helda Jana, and Benjamin Mordmllera, "In Vitro Activity of Fluorescent Dyes against Asexual Blood Stages of Plasmodium falciparum" DOI: 10.1128/AAC.00709-12.
Kawamoto, F. and P.F.Billingsley, "Rapid diagnosis of malaria by fluorescence microscopy", Parasitology Today, 8.2 (1992): 69-71.
Kawamoto,F. "Rapid diagnosis of malaria by fluorescence microscopy with light microscope and interference filter", The Lancet, vol. 337, pp. 200-202, Jan. 26, 1991.
Keiser, J. et al., "Acridine Orange for malaria diagnosis: its diagnostic performance, its promotion and implementation in Tanzania, and the implications for malaria control", Annals of Tropical Medicine and parasitology, 96.7 (2002): 643-654.
Knesel, "Roche Image Analysis Systems, Inc.", Acta Cytologica, vol. 40, pp. 60-66, (1996).
Kumar, Amit et al. "Enhanced Identification of Malarial Infected Objects using Otsu Algorithm from Thin Smear Digital Images." International Journal of Latest Research in Science and Technology vol. 1, Issue 2 :pp. 159-163, Jul.-Aug. 2012).
Le, Minh-Tam et al., "A novel semi-automatic image processing approach to determine Plasmodium falciparum parasitemia in Giemsa-stained thin blood smears", BMC Cell Biology, published Mar. 28, 2008.
Leif, "Methods for Preparing Sorted Cells as Monolayer Specimens", Springer Lab Manuals, Section 7—Chapter 5 pp. 592-619, (2000).
Life Technologies Corporation, "Counting blood cells with Countless Automated Cell Counter" found at http://www.lifetechnologies.com/content/dam/LifeTech/migration/files/cell-tissue-analysis/pdfs.par.83996.file.dat/w-082149-countless-application-blood-cells.pdf, four pages, (2009).
Matcher, S.J., et al. "Use of the water absorption spectrum to quantify tissue chromophore concentration changes in near-infrared spectroscopy", Physics in Medicine & Biology, vol. 39, No. 1, 1994 pp. 177-196, IOP Publishing Ltd., UK.
Mendiratta, D.K. et al. Evaluation of different methods for diagnosis of P. falciparum malaria; Indian J Med Microbiol. Jan. 2006;24(1):49-51.
Merchant et al. , "Computer-Assisted Microscopy", The essential guide to image processing, Chapter 27, pp. 777-831, Academic Press, (2009).
Moody , "Rapid Diagnostic Tests for Malaria Parasites", Clinical Microbiology Reviews, vol. 15, No. 1, pp. 66-78, 12 (2002).
Moon S, Lee S, Kim H, Freitas-Junior LH, Kang M, Ayong L, et al. (2013) An Image Analysis Algorithm for Malaria Parasite Stage Classification and Viability Quantification. PLoS One 8(4): e61812. https://doi.org/10.1371/journal.pone.0061812.
Notice of Allowance dated Dec. 30, 2015 U.S. Appl. No. 14/440,864.
Notice of Allowance dated Jan. 11, 2016, which issued during the prosecution of U.S. Appl. No. 14/440,864.
Notice of Allowance dated Jan. 19, 2016, which issued during the prosecution of U.S. Appl. No. 13/338,291.
Notice of Allowance dated Mar. 10, 2016, which issued during the prosecution of U.S. Appl. No. 13/338,291.
Notice of Allowance dated Jul. 10, 2019 in U.S. Appl. No. 15/506,997.
Notice of Allowance dated Mar. 20, 2019, which issued during the prosecution of U.S. Appl. No. 15/506,997.
Ortyn, William E.,et al. "Extended Depth of Field Imaging for High Speed Cell Analysis." Cytometry Part A 71.4, 2007): 215-231.
Osibote, O. A., et al. "Automated focusing in bright-field microscopy for tuberculosis detection", Journal of Microscopy 240.2 (2010)pp. 155-163.
Pasini, Erica M. et al. "A novel live-dead staining methodology to study malaria parasite viability"; Malaria Journal 2013 12:190.

(56) References Cited

OTHER PUBLICATIONS

Piruska, Aigars et al., "The autofluorescence of plastic materials and chips measured under laser irradiation" Lab on a Chip, 2005, 5, 1348-1354, published Nov. 1, 2005.
Poon et al., "Automated Image Detection and Segmentation in Blood Smears", [Cytometry 1992 13:766-774].
Purwar, Yashasvi, et al. "Automated and Unsupervised Detection of Malarial Parasites in Microscopic Images." Malaria Journal 10.1 (2011): 364.
Rappaz, Benjamin et al., "Comparative study of human erythrocytes by digital holographic microscopy, confocal microscopy, and impedance volume analyzer" Cytometry Part A, 2008, vol. 73, Issue 10, pp. 895-903, John Wiley & Sons, US.
Roma, P. M. S., et al. "Total three-dimensional imaging of phase objects using defocusing microscopy: Application to red blood cells." Applied Physics Letters 104,25 (2014): 251107.
Ross, Nichoals E., et al., "Automated image processing method for the diagnosis and classification of malaria on thin blood smears", Medical and Biological Engineering and Computing, May 2006, vol. 44, Issue 5, pp. 427-436, Springer Publishing Company, US.
Sheikh , H., Bin Zhu, Micheli-Tzanakou, E. (1996) "Blood cell identification using neural networks." Proceedings of the IEEE 22nd Annual Northeast Bioengineering Conference; pp. 119-120.
Shen, Feimo, Louis Hodgson and Klaus Hahn, "Digital autofocus method for automated microscopy", Methods in Enzymology vol. 414, 2006, pp. 620-632.
Shute G. T. and T. M. Sodeman, "Identification of malaria parasites by fluorescence microscopy and acridine orange staining", Bulletin of the World Health Organ. 1973; 48(5): 591-596.
Sun, Yu, S. Duthaler and B.J. Nelson, "Autofocusing algorithm selection in computer microscopy", 2005 IEEE/RSJ International Conference on Intelligent Robots and Systems.
Tek, F. Boray, Andrew G. Dempster, and Izzet Kale. "Computer Vision for Microscopy Diagnosis of Malaria." Malaria Journal 8.1 (2009): 153.
Thung, Ferdian, and Iping Supriana Suwardi. "Blood Parasite Identification Using Feature Based Recognition." Electrical Engineering and Informatics (ICEEI), 2011 International Conference on. IEEE, 2011.
U.S. Appl. No. 61/427,809, filed Dec. 29, 2010.
U.S. Appl. No. 61/870,106, filed Aug. 26, 2013.
U.S. Appl. No. 62/042,388, filed Aug. 27, 2014.
Unitaid Malaria Diagnostic Technology and Market Landscape, 2nd Edition (2014).
Wissing, Frank et al. "Illumination of the Malaria Parasite Plasmodium falciparum Alters Intracellular pH", Implications for Live Cell Imaging; published Jul. 24, 2002, JBS Papers in Press, vol. 277 No. 40, pp. 27747-37755.
Wright, J H. "A Rapid Method for the Differential Staining of Blood Films and Malarial Parasites" Journal of medical research vol. 7,1 (1902): 138-44.
Wu, Caicai et al., "Feasibility study of the spectroscopic measurement of oxyhemoglobin using whole blood without pre-treatment", The Analyst, Mar. 1998, pp. 477-481, vol. 123 (5 pages total).
Wu, Qiang, Fatima Mechant, and Kenneth Castleman. Microscope Image Processing. Chapter 16, Autofocusing, pp. 441-467, Academic Press, 2010.
Xu, Lili, Asok Chaudhuri, "Plasmodium yoelii: A differential fluorescent technique using Acridine Orange to identify infected erythrocytes and reticulocytes in Duffy knockout mouse", Experimental Parasitology, vol. 110, Issue 1, May 2005, pp. 80-87, https://www.sciencedirect.com/science/article/pii/S001448940500038X, (May 31, 2005).
Yang, Ming, and Li Luo. "A Rapid Auto-Focus Method in Automatic Microscope." Signal Processing, 2008. ICSP 2008. 9th International Conference on. IEEE,2008.
Yao, LN et al. "Pathogen identification and clinical diagnosis for one case infected with Babesia". Zhongguo ji sheng chong xue yu ji sheng chong bing za zhi Chinese journal of parasitology parasitic diseases, Aug. 2012.
Yazdanfar, S., Kenny, K.B., Tasimi, K., Corwin, A.D., Dixon, E.L. and Filkins, R.J., 2008. Simple and robust image-based autofocusing for digital microscopy. Optics express, 16(12), pp. 8670-8677.
Zahniser et al., Automated Slide Preparation System for the Clinical Laboratory, Cytometry, vol. 26, No. 10, pp. 60-64, (1996).
A European Examination Report dated Dec. 9, 2019. which issued during the prosecution of Applicant's European App No. 16782094.3.
Notice of Allowance dated Mar. 2, 2020, which issued during the prosecution of U.S. Appl. No. 16/657,473.
A European Examination Report dated Feb. 1, 2019. which issued during the prosecution of Applicant's European App No. 17717000.8.
A European Examination Report dated Sep. 3, 2019. which issued during the prosecution of Applicant's European App No. 17717000.8.
A European Examination Report dated Apr. 8, 2020. which issued during the prosecution of Applicant's European App No. 17717000.8.
A European Examination Report dated Apr. 6, 2020. which issued during the prosecution of Applicant's European App No. 17726036.1.
A European Examination Report dated Feb. 11, 2020. which issued during the prosecution of Applicant's European App No. 17728277.9.
An Indian Examination Report dated Apr. 22, 2020. which issued during the prosecution of Indian App No. 201617009399.
An Office Action dated Aug. 24, 2020 for U.S. Appl. No. 16/098,893.
A Chinese Office Action and dated May 22, 2020. which issued during the prosecution of Chinese Application No. 201680053431.1.
A Restriction Requirement issued by the USPTO on Aug. 24, 2020 for U.S. Appl. No. 16/088,321.
Saraswat, et al. "Automated microscopic image analysis for leukocytes identification: A survey", ABV-Indian Institute of Information Technology and Management, Gwalior, India.
Hiremath, P.S,. et al., "Automated Identification and Classification of White Blood Cells (Leukocytes) in Digital Microscopic Images", IJCA Special Issue on "Recent Trends in Image Processing and Pattern Recognition" RTIPPR, 2010.
Witt, et al. "Establishing traceability of photometric absorbance values for accurate measurements of the haemoglobin concentration in blood.", Metrologia 50 (2013) 539-548.
Putzu, et al., "Leucocyte classification for leukaemia detection using image processing techniques.", Artificial Intelligence in Medicine, vol. 63, No. 3, Nov. 1, 2014.
Varga, et al., "An automated scoring procedure for the micronucleus test by image analysis,",Mutagenesis vol. 19 No. 5 pp. 391-397, 2004.
Ran, Qiong et al. "Spatial-spectral blood cell classification with microscopic hyperspectral imagery", Proc. SPIE 10461, AOPC 2017: Optical Spectroscopy and Imaging, 1046102 (Oct. 24, 2017).
Omucheni et al. "Application of principal component analysis to multispectral-multimodal optical image analysis for malaria diagnostics", Malaria Journal 2014, 13:485 http://www.malariajournal.com/content/13/1/485.
Ben-Suliman-2018-Computerized Counting-Based System for Acute Lymphoblastic Leukemia Detection in Microscopic Blood Images: 27th International Conference on Artificial Neural Networks, Rhodes, Greece, Oct. 4-7, 2018, Proceedings, Part II.
An Office Action dated Dec. 8, 2020 for Japanese Patent Application No. 2018/512961.
An Examination Report issued on Dec. 7, 2020 for Australian Patent Application No. 2016322966.
An Office Action dated Jan. 11, 2021 for U.S. Appl. No. 16/098,893.
An Examination Report issued on Apr. 29, 2021 for Australian Patent Application No. 2016322966.
International Search Report issued for PCT Application No. PCT/IB2020/059924 on Mar. 22, 2021.
International Search Report issued for PCT Application No. PCT/IB2020/059925 on Mar. 26, 2021.
Invitation to pay fees and Partial Search Report issued for PCT Application No. PCT/IB2020/059924 on Jan. 28, 2021.

(56) References Cited

OTHER PUBLICATIONS

Invitation to pay fees and Partial Search Report issued for PCT Application No. PCT/IB2020/059925 on Feb. 4, 2021.
A Japanese Office Action dated Mar. 30, 2021. which issued during the prosecution of Application No. 2018/558180.
An Office Action dated Mar. 9, 2021 for U.S. Appl. No. 16/088,321.
An Office Action dated Jan. 29, 2021 for U.S. Appl. No. 16/099,270.
Bovik, Alan C., et. "The Essential Guide to Image Processing", Chapter 27, "Computer Assisted Microscopy",pp. 777-831; Academic Press, 2009 (Merchant).
Price Jeffrey H. and David A. Gough, "Comparison of phase-contrast and fluorescence digital autofocus for scanning microscopy", Cytometry 16.4 (1994) 283-297.
Vink, J.P. et al., "An automatic vision-based malaria diagnosis system", Journal of Microscopy 250.3 (2013):166-178.
An International Search Report and Written Opinion for Application No. PCT/IB2020/061731 issued on Feb. 10, 2021.
Invitation to pay fees and Partial Search Report issued for PCT Application No. PCT/IB2020/061732 on Mar. 10, 2021.
Invitation to pay fees and Partial Search Report issued for PCT Application No. PCT/IB2020/061736 on Mar. 12, 2021.
Invitation to pay fees and Partial Search Report issued for PCT Application No. PCT/IB2020/061728 on Mar. 15, 2021.
International Search Report issued for PCT Application No. PCT/IB2020/061724 on Mar. 10, 2021.
An International Search Report and Written Opinion for PCT Application No. PCT/IB2020/061732 mailed on May 7, 2021.
International Search Report and Written Opinion for PCT Application No. PCT/IB2020/061728 mailed on May 7, 2021.
International Search Report and Written Opinion for PCT Application No. PCT/IB2020/061736 mailed on May 3, 2021.
Non-Final Office Action dated Jun. 17, 2021 which issued during the prosecution of U.S. Appl. No. 16/851,410.
A Final Office Action dated Jun. 17, 2021 which issued during the prosecution of U.S. Appl. No. 16/088,321.
Notice of Allowance dated May 19, 2021 which issued during the prosecution of U.S. Appl. No. 16/099,270.
A Restriction Requirement issued by the USPTO on Oct. 19, 2020 for U.S. Appl. No. 16/099,270.
An Extended European Search Report issued for European Patent Application No. 21164814.2 on Jun. 9, 2021.
Third Office Action dated Jul. 12, 2021 which issued during the prosecution of Chinese Patent Application No. 201680053431.1.
Non-Final Office Action dated Jul. 27, 2021, which issued during the prosecution of U.S. Appl. No. 16/851,686.
Non-Final Office Action dated Aug. 19, 2021, which issued during the prosecution of U.S. Appl. No. 16/098,893.
Non-Final Office Action dated Sep. 1, 2021 which issued during the prosecution of U.S. Appl. No. 16/088,321.
First Office Action dated Aug. 4, 2021 which issued during the prosecution of Chinese Patent Application No. 201780027908.3.
An Examination Report dated Mar. 4, 2021 which issued during the prosecution of Indian Patent Application No. 201817036130.
An Examination Report dated May 5, 2021 which issued during the prosecution of Indian Patent Application No. 201817012117.
Non-Final Office Action dated Oct. 6, 2021, which issued during the prosecution of U.S. Appl. No. 17/063,320.
Notice of Allowance dated Aug. 3, 2021, which issued during the prosecution of U.S. Appl. No. 16/851,410.
Notice of Allowance dated Nov. 5, 2021, which issued during the prosecution of U.S. Appl. No. 16/851,410.
Notice of Allowance dated Nov. 10, 2021, which issued during the prosecution of U.S. Appl. No. 16/851,686.
Supplemental Notice of Allowance dated Nov. 12, 2021, which issued during the prosecution of U.S. Appl. No. 16/851,686.
A European Examination Report issued for European Patent Application No. 17728277.9 on Dec. 23, 2021.
Notice of Allowance dated Jan. 21, 2022, which issued during the prosecution of U.S. Appl. No. 16/098,893.
An Office Action dated Feb. 16, 2022 which issued during the prosecution of U.S. Appl. No. 16/088,321.
Bonnekoh, Bernd, et al. "Profiling lymphocyte subpopulations in peripheral blood under efalizumab treatment of psoriasis by multi epitope ligand cartography (MELC) robot microscopy", European Journal of Dermatology, 2006, vol. 16 No. 6 (3 pages).
Chinese Office Action dated Feb. 27, 2025 which issued during the prosecution of Application No. 202080085933.9.
Chinese Office Action dated Jan. 27, 2025 which issued during the prosecution of Application No. 202080085480.X.
Chinese Office Action dated May 23, 2024 which issued during the prosecution of Application No. 202080073583.4.
Chinese Office Action dated May 23, 2024 which issued during the prosecution of Application No. 202080073623.5.
Chinese Office Action dated Nov. 25, 2024 which issued during the prosecution of Application No. 202080073583.4.
Chinese Office Action dated Nov. 25, 2024 which issued during the prosecution of Application No. 202080073623.5.
Combined Search and Examination Report issued for EP 20828313.5 on Sep. 11, 2024.
European Examination Report dated Jun. 13, 2025. which issued during the prosecution of Applicants European App No. 22209948.3.
Examination Report dated Jan. 23, 2025 which issued during the prosecution of New Zealand Application No. 787745.
Examination Report dated Oct. 23, 2024 which issued during the prosecution of European Application No. 20828312.7.
Examination Report dated Oct. 23, 2024 which issued during the prosecution of New Zealand Application No. 787745.
Examination Report dated Oct. 31, 2024 which issued during the prosecution of New Zealand Application No. 787743.
Final Office Action dated Dec. 19, 2024, which issued during the prosecution of U.S. Appl. No. 17/063,320.
Final Office Action dated Dec. 30, 2024, which issued during the prosecution of U.S. Appl. No. 17/083,647.
Final Office Action dated for U.S. Appl. No. 17/770,365 dated Apr. 28, 2025.
Final Office Action dated May 20, 2025, which issued during the prosecution of U.S. Appl. No. 17/083,647.
First Office Action for Chinese Application No. 202111613655.2 dated May 8, 2025.
First Office Action for Chinese Application No. 202210483679.9 dated Apr. 30, 2025.
Haroon Hussain et al., "Hide and seek: hematological aspects of malaria a developing country perspective", J Infect DevCitries, 2013, vol. 7, No. 3, pp. 273-279.
Horton, A. P., K. Kumar, H. Liu, L. Cheng, N. Lane, E. Taylor, H. R. Garner, J. W. Uhr, and X. J. Zhang. "Quantitative immunophenotyping of circulating tumor cells in blood using microfluidic screening chip integrated with hyperspectral microscope." In Transducers 2009-2009 International Solid-State Sensors, Actuators and Microsystems Conference, pp. 77-80. IEEE, 2009.
International Search Report and Written Opinion issued for PCT Application No. PCT/IB2024/054798 on Sep. 2, 2024.
Invitation to Pay Additional Search Fees issued on Jul. 10, 2024 by the WIPO for PCT/IB2024/054798.
Japanese Office Action dated Jan. 14, 2025 which issued during the prosecution of Application No. 2024-15207.
Japanese Office Action dated Jul. 1, 2024 which issued during the prosecution of Application No. 2022-521112.
Japanese Office Action dated Jul. 3, 2024 which issued during the prosecution of Application No. 2022-521238.
Japanese Office Action dated Nov. 5, 2024 which issued during the prosecution of Application No. 2022-534369.
Japanese Office Action dated Nov. 11, 2024 which issued during the prosecution of Application No. 2022-521238.
Japanese Office Action dated Nov. 7, 2024 which issued during the prosecution of Application No. 2022-521112.
Niehues T, Kapaun P, Harms DO, Burdach S, Kramm C, Krholz D, Janka-Schaub G, Gbel U. "A classification based on T cell selection-related phenotypes identifies a subgroup of childhood T-ALL with favorable outcome in the COALL studies", Leukemia. Apr. 1999, vol. 13, pp. 614-617.

(56) References Cited

OTHER PUBLICATIONS

Non-Final Office Action dated Jul. 8, 2024 which issued during the prosecution of U.S. Appl. No. 18/397,324.
Notice of Allowance dated Aug. 7, 2024, which issued during the prosecution of U.S. Appl. No. 17/783,924.
Notice of Allowance dated Mar. 8, 2024, which issued during the prosecution of U.S. Appl. No. 17/082,615.
Notice of Allowance dated Sep. 23, 2024, which issued during the prosecution of U.S. Appl. No. 18/203,109.
Notice of Allowance for U.S. Appl. No. 17/063,320 on Apr. 21, 2025.
Notice of Allowance issued for U.S. Appl. No. 18/203,109 on Jun. 13, 2024.
Novelli, Enrico M., et al. "Clinical predictors of severe malarial anaemia in a holoendemic Plasmodium falciparum transmission area." British journal of haematology, 2010, vol. 149, No. 5, pp. 711-721.
Office Action dated Aug. 15, 2024 which issued during the prosecution of U.S. Appl. No. 17/083,647.
Office Action dated Jan. 13, 2025 which issued during the prosecution of U.S. Appl. No. 17/770,365.
Office Action dated Jan. 15, 2025 which issued during the prosecution of U.S. Appl. No. 17/836,561.
Office Action dated Jul. 1, 2025 which issued during the prosecution of U.S. Appl. No. 17/783,831.
Office Action dated Jun. 16, 2025 which issued during the prosecution of Canadian Application No. 3,160,692.
Office Action dated Mar. 13, 2025 which issued during the prosecution of U.S. Appl. No. 17/783,831.
Office Action dated Mar. 5, 2025 which issued during the prosecution of Japanese Patent Application No. 2022-534230.
Office Action dated Oct. 3, 2024 which issued during the prosecution of Japanese Patent Application No. 2022-534230.
Office Action dated Oct. 7, 2024 which issued during the prosecution of Japanese Patent Application No. 2022-534229.
Office Action dated Sep. 3, 2024 which issued during the prosecution of Canadian Patent Application No. 3,081,669.
Philip E. Thuma, Janneke van Dijk, Rick Bucala, Zufan Debebe, Sergei Nekhai, Thea Kuddo, Mehdi Nouraie, Gnter Weiss, Victor R. Gordeuk, Distinct Clinical and Immunologic Profiles in Severe Malarial Anemia and Cerebral Malaria in Zambia, The Journal of Infectious Diseases, vol. 203, Issue 2, Jan. 15, 2011, pp. 211-219.
Restriction Requirement dated Jun. 17, 2025 which issued during the prosecution of U.S. Appl. No. 17/783,839.

\* cited by examiner

ACCOUNTING FOR ERRORS IN OPTICAL MEASUREMENTS

The present application is a US national phase application of PCT Application No. PCT/IB2020/059924 to Pecker (published as WO 21/079305), filed Oct. 22, 2010, which claims priority from U.S. Provisional Patent Application No. 62/924,229 to Pecker, filed Oct. 22, 2019, entitled "Accounting for errors in optical measurements."

The present application is related to PCT application PCT/IB2020/059925, filed Oct. 22, 2020, entitled "Accounting for errors in optical measurements" to Pecker, claiming priority from U.S. Provisional Patent Application No. 62/924,229 to Pecker, filed Oct. 22, 2019.

The above-referenced applications are incorporated herein by reference.

FIELD OF EMBODIMENTS OF THE INVENTION

Some applications of the presently disclosed subject matter relate generally to analysis of bodily samples, and in particular, to optical density and microscopic measurements that are performed upon blood samples.

BACKGROUND

In some optics-based methods (e.g., diagnostic, and/or analytic methods), a property of a biological sample, such as a blood sample, is determined by performing an optical measurement. For example, the density of a component (e.g., a count of the component per unit volume) may be determined by counting the component within a microscopic image. Similarly, the concentration and/or density of a component may be measured by performing optical absorption, transmittance, fluorescence, and/or luminescence measurements upon the sample. Typically, the sample is placed into a sample carrier and the measurements are performed with respect to a portion of the sample that is contained within a chamber of the sample carrier. The measurements that are performed upon the portion of the sample that is contained within the chamber of the sample carrier are analyzed in order to determine a property of the sample.

SUMMARY OF EMBODIMENTS

In accordance with some applications of the present invention, a biological sample (e.g., a blood sample) is placed into a sample carrier. While the sample is disposed in the sample carrier, optical measurements are performed upon the sample using one or more optical measurement devices. For example, the optical measurement devices may include a microscope (e.g., a digital microscope), a spectrophotometer, a photometer, a spectrometer, a camera, a spectral camera, a hyperspectral camera, a fluorometer, a spectrofluorometer, and/or a photodetector (such as a photodiode, a photoresistor, and/or a phototransistor). For some applications, the optical measurement devices include dedicated light sources (such as light emitting diodes, incandescent light sources, etc.) and/or optical elements for manipulating light collection and/or light emission (such as lenses, diffusers, filters, etc.). For some applications, a microscope system is used that is generally similar to the microscope system described in US 2014/0347459 to Greenfield, which is incorporated herein by reference.

A computer processor typically receives and processes optical measurements that are performed by the optical measurement device. Further typically, the computer processor controls the acquisition of optical measurements that are performed by the one or more optical measurement devices. For some applications, the optical measurement device is housed inside an optical measurement unit. In order to perform the optical measurements upon the sample, the sample carrier is placed inside the optical measurement unit. Typically, the optical measurement unit includes a microscope system configured to perform microscopic imaging of a portion of the sample. For some applications, the microscope system includes a set of brightfield light sources (e.g. light emitting diodes) that are configured to be used for brightfield imaging of the sample, a set of fluorescent light sources (e.g. light emitting diodes) that are configured to be used for fluorescent imaging of the sample, and a camera (such as a CCD camera and/or a CMOS camera) configured to image the sample. Typically, the optical measurement unit also includes an optical-density-measurement unit configured to perform optical density measurements (e.g., optical absorption measurements) on a second portion of the sample. For some applications, the optical-density-measurement unit includes sets of optical-density-measurement light sources (e.g., light emitting diodes) and light detectors, which are configured for performing optical density measurements on the sample. For some applications, each of the aforementioned sets of light sources (i.e., the set of brightfield light sources, the set of fluorescent light sources, and the set optical-density-measurement light sources) includes a plurality of light sources (e.g. a plurality of light emitting diodes), each of which is configured to emit light at a respective wavelength or at a respective band of wavelengths.

In accordance with some applications of the present invention, various techniques are performed (typically by the computer processor), in order to determine whether various errors have occurred, and optionally to identify the source of the error if an error has occurred. Such errors may result from the preparation of all of the sample. For example, the sample may have been left in the sample carrier for too long before the measurements were performed (which may result in the sample become degraded, and/or which may result in stains that were mixed with one or both portions of the sample from becoming overly-absorbed by entities within the sample). Alternatively, errors may result from the preparation of a particular portion of the sample. Alternatively or additionally, errors may result from an error with the sample carrier (such as the material of the sample carrier itself being unclean, and/or dirt or spilled blood on the sample carrier), and/or an error with the microscope system itself, such as lighting (e.g., a light emitting diode that used for the brightfield imaging, and/or a light emitting diode that is used during fluorescent imaging of the sample), and/or errors associated with the optical path, and/or motor and stage components or controllers, and/or errors resulting from the environment in which the device is placed (such as, relative humidity, temperature, pressure, particulate concentration, or any other environmental factor). Further alternatively or additionally, there may be an inherent problem with the sample (such as a very low count or a very high count of a certain entity, or too much time having elapsed since the sample collection was performed), which means that the computer processor is unable to perform certain measurements with a sufficient degree of accuracy, and/or which means that the computer processor should flag this to the user.

For some applications, in response to identifying an error, the computer processor outputs a message indicating the error and/or indicating the source of the error. For some applications, the computer processor does not perform certain measurements upon the blood sample in response to identifying an error. For some applications, in response to identifying the error, the computer processor does not perform any measurements on the sample, and/or flags that the sample is invalid to the user, and/or instructs the user to repeat the sample preparation with a new test kit and/or to re-collect the blood sample. Alternatively or additionally, certain parameters of the blood sample are determined by the computer processor by calibrating measurements that are performed upon the blood sample, in order to account for the error.

For some applications, one or more of the following errors is accounted for, e.g., in one or more of the above-described ways:

Errors in the microscopy device, such as:
steps-loss in a motor that moves the microscope stage
changes in backlash of the movement of the microscope stage
changes in timing between the microscope camera and the microscope stage
alignment between microscope camera and the microscope stage (e.g., due to relative rotation between these elements)
issues with the optical system (for example, changes in focus quality over time, e.g., caused by samples, or caused by a piece of the microscope stage (e.g., a scratched piece))
levelling changes in the microscope system
change in expected focus location along the z-axis (i.e., the optical axis)
loss of communication between elements
changes in the camera linear response
Errors caused by environmental factors, such as:
device outside of allowable temperature, humidity, elevation, etc.
specific components outside of target values
General errors, caused by factors such as:
time of scan
time of device startup
available working/storage memory Some examples of the techniques for identifying errors and accounting for such errors are described hereinbelow.

There is therefore provided, in accordance with some applications of the present invention, a method including:
preparing a blood sample for analysis by:
depositing the blood sample within a sample chamber; and
placing the sample chamber, with the blood sample deposited therein, within a microscopy unit;
acquiring one or more microscopic images of the sample chamber with the blood sample deposited therein, using a microscope of the microscopy unit;
based upon the one or more images, determining an amount of one or more cell types within the sample chamber that had already settled within the sample chamber, prior to acquisition of the one or more microscopic images; and
determining a characteristic of the sample, at least partially in response thereto.

In some applications, preparing the blood sample for analysis further includes staining the blood sample with one or more stains.

In some applications:
determining an amount of one or more cell types within the sample chamber that had already settled within the sample chamber, prior to acquisition of the one or more microscopic images includes determining whether more than a threshold amount of red blood cells within the sample chamber had already settled within the sample chamber, prior to acquisition of the one or more microscopic images, and
determining the characteristic of the sample includes, in response to determining that more than the threshold amount of red blood cells within the sample chamber had already settled within the sample chamber prior to acquisition of the one or more microscopic images, invalidating the at least a portion of the sample from being used for performing at least some measurements upon the sample.

In some applications, the method further includes:
subsequent to placing the sample chamber, with the blood sample deposited therein, within the microscopy unit, allowing the one or more cell types within the sample chamber to form a monolayer of cells;
acquiring a set of one or more additional microscopic images of the monolayer of cells; and
performing one or more measurements upon the sample, by analyzing the set of one or more additional microscopic images.

In some applications, the method further includes determining an indication of how long
the blood sample has been in the sample chamber prior to acquisition of the one or more microscopic images, based upon the amount of the one or more cell types that had already settled within the sample chamber, prior to acquisition of the one or more microscopic images.

In some applications,
the method further includes performing one or more measurements upon the sample,
determining the amount of the one or more cell types within the sample chamber that had already settled within the sample chamber, prior to acquisition of the one or more microscopic images includes determining whether more than a threshold amount of red blood cells within the sample chamber had already settled within the sample chamber, prior to acquisition of the one or more microscopic images, and
performing one or more measurements upon the sample includes, in response to determining that more than the threshold amount of red blood cells within the sample chamber had already settled within the sample chamber, prior to acquisition of the one or more microscopic images, calibrating the measurements.

In some applications, preparing the blood sample for analysis further includes staining the blood sample with one or more stains, calibrating the measurements includes calibrating the measurements to account for an amount of staining that entities within the blood sample underwent as indicated by more than the threshold amount of red blood cells within the sample chamber having already settled within the sample chamber, prior to acquisition of the one or more microscopic images.

There is further provided, in accordance with some applications of the present invention, a method including:
placing a portion of a blood sample within a sample chamber;
acquiring microscopic images of red blood cells within the blood sample, while the red blood cells within the blood sample are settling within the sample chamber;
determining a settling-dynamics characteristic of the blood sample by analyzing the images; and
generating an output in response thereto.

In some applications, placing the portion of the blood sample within the sample chamber includes placing an undiluted portion of a blood sample within the sample chamber and acquiring microscopic images of red blood cells within the blood sample includes acquiring microscopic images of red blood cells within the undiluted blood sample.

In some applications, determining the settling-dynamics characteristic of the blood sample by analyzing the images includes determining the settling-dynamics characteristic of the blood sample in real-time with respect to the settling of the red blood cells within the blood sample.

In some applications, determining the settling-dynamics characteristic of the blood sample by analyzing the images includes determining the settling-dynamics characteristic of the blood sample, while the red blood cells within the blood sample are still settling.

In some applications, determining the settling-dynamics characteristic of the blood sample by analyzing the images includes determining a sedimentation rate of red blood cells in the blood sample by analyzing the images.

There is further provided, in accordance with some applications of the present invention, a method including:
  placing a first portion of a blood sample within a first sample chamber;
  placing a second portion of the blood sample within a second sample chamber;
  acquiring microscopic images of the first portion of the blood sample;
  performing optical density measurements on the second portion of the blood sample;
  detecting that a concentration of a given entity within the sample passes a threshold; and
  determining a cause for the concentration of the given entity passing the threshold by comparing a parameter determined from the microscopic images of the first portion of the blood sample to a parameter determined from the optical density measurements performed on the second portion of the blood sample.

In some applications, determining the cause for the concentration of the given entity passing the threshold includes determining that the blood sample itself is the cause of the concentration of the given entity within the sample passing the threshold by determining that a concentration of the entity as indicated by the microscopic images is similar to the concentration of the entity as determined from the optical density measurements.

In some applications, determining the cause for the concentration of the given entity passing the threshold includes determining that preparation of one of the portions of the blood sample is the cause of the concentration of the given entity within the sample passing the threshold by determining that a concentration of the entity as indicated by the microscopic images is different from the concentration of the entity as determined from the optical density measurements.

There is further provided, in accordance with some applications of the present invention, a method including:
  placing at least a portion of a blood sample within a sample chamber;
  acquiring microscopic images of the portion of the blood sample;
  identifying, within the microscopic image, at least one type of entity selected from the group consisting of: echinocytes, spherocytes, and crenate red blood cells;
  measuring a count of the selected type of entity; and
  generating an output in response thereto.

In some applications, identifying the at least one type of entity includes identifying echinocytes. In some applications, identifying the at least one type of entity includes identifying spherocytes. In some applications, identifying the at least one type of entity includes identifying crenate red blood cells.

In some applications, generating the output includes invalidating at least the portion of the blood sample from being used to perform at least some measurements upon the blood sample, at least partially based upon the count of the selected type of entity passing a threshold. In some applications, generating the output includes generating an indication of the count to a user. In some applications, generating the output includes generating an indication of an age of the portion of the sample to a user.

There is further provided, in accordance with some applications of the present invention, a method including:
  placing at least a portion of a blood sample within a sample chamber;
  acquiring microscopic images of the portion of the blood sample;
  identifying, within the microscopic images, at least one type of entity selected from the group consisting of: echinocytes, spherocytes, and crenate red blood cells;
  measuring a count of the selected type of entity; and
  determining an indication of an age of the portion of the sample, at least partially based upon the count.

In some applications, the method further includes measuring a parameter of the sample by analyzing the microscopic images, and measuring the parameter of the sample includes performing a measurement upon the microscopic images and calibrating the measurement based upon the determined indication of the age of the portion of the sample.

In some applications, the method further includes measuring a parameter of the sample by performing optical density measurements upon a second portion of the blood sample, and measuring the parameter of the sample includes calibrating the optical density measurements based upon the determined indication of the age of the portion of the sample.

In some applications, identifying the at least one type of entity includes identifying echinocytes. In some applications, identifying the at least one type of entity includes identifying spherocytes. In some applications, identifying the at least one type of entity includes identifying crenate red blood cells.

There is further provided, in accordance with some applications of the present invention, a method including:
  placing at least a portion of a blood sample within a sample chamber that is a cavity that includes a base surface;
  allowing the cells in the cell suspension to settle on the base surface of the carrier to form a monolayer of cells on the base surface of the carrier;
  acquiring at least one microscope image of at least a portion of the monolayer of cells;
  identifying, within the microscopic image, hemolyzed red blood cells;
  measuring a count of the identified hemolyzed red blood cells; and
  generating an output, based upon the count of the identified hemolyzed red blood cells.

In some applications, the method further includes, based upon the count of the identified hemolyzed red blood cells, estimating a total count of hemolyzed red blood cells within the blood sample that is greater than the count of the identified hemolyzed red blood cells, and generating the output includes generating an indication of the estimated total count of hemolyzed red blood cells to a user.

In some applications, generating the output includes invalidating the portion of the sample from being used for performing at least some measurements upon the sample, at least partially based upon the count of the identified hemolyzed red blood cells passing a threshold.

In some applications, invalidating the sample from being used for performing at least some measurements upon the sample includes, based upon the count of the identified hemolyzed red blood cells, estimating a total count of hemolyzed red blood cells within the sample that is greater than the count of the identified hemolyzed red blood cells.

In some applications, the method further includes staining the blood sample, and identifying the at least partially hemolyzed red blood cells includes distinguishing the hemolyzed red blood cells from non-hemolyzed red blood cells by identifying red blood cells that are stained by the stain as being hemolyzed.

In some applications, staining the blood sample includes staining the blood sample with a Hoechst reagent.

In some applications, acquiring at least one microscope image of at least a portion of the monolayer of cells includes acquiring at least one brightfield microscope image of at least a portion of the monolayer of cells, and identifying red blood cells that are stained by the stain includes identifying red blood cells having an outline that is visible within the brightfield microscope image and having an interior that is similar to a background of the brightfield microscope image.

In some applications, acquiring at least one microscope image of at least a portion of the monolayer of cells includes acquiring at least one fluorescent microscope image of at least a portion of the monolayer of cells, and identifying red blood cells that are stained by the stain includes identifying red blood cells that appear as bright circles within the image.

There is further provided, in accordance with some applications of the present invention, a method including:
   placing a biological sample into a sample chamber that has a plurality of regions, each of which define respective different heights;
   measuring a parameter that is indictive of light transmission through the sample chamber at respective regions; and
   using a computer processor:
      normalizing the parameter as measured at the respective regions with respect to each other;
      detecting that there is a bubble within the sample chamber, at least partially in response thereto; and
      performing an action in response to detecting that there is a bubble within the sample chamber.

There is additionally provided, in accordance with some applications of the present invention, a method including:
   placing a blood sample into a sample chamber that has a plurality of regions, each of which define respective different heights;
   measuring a parameter that is indictive of light transmission through the sample chamber at respective regions; and
   using a computer processor:
      based upon an absolute value of the parameter at the selected regions, calculating hemoglobin concentration within the sample;
      normalizing the parameter as measured at the respective regions with respect to each other; and
      validating the calculated hemoglobin concentration based upon the normalized parameter.

There is further provided, in accordance with some applications of the present invention, a method including:
   placing at least a portion of a blood sample within a sample chamber;
   acquiring microscopic images of the portion of the blood sample;
   identifying, within the microscopic image, candidates of a given entity within the blood sample;
   validating at least some of the candidates as being the given entity, by performing further analysis of the candidates;
   comparing a count of the candidates of the given entity to a count of the validated candidates of the given entity; and
   invalidating at least the portion of the sample from being used for performing at least some measurements upon the sample, at least partially based upon a relationship between the count of candidates and the count of validated candidates.

In some applications:
   identifying, within the microscopic image, candidates of a given entity within the blood sample includes identifying, within the microscopic image, platelet candidates within the blood sample;
   validating at least some of the candidates as being the given entity, by performing further analysis of the candidates includes validating at least some of the platelet candidates as being platelets, by performing further analysis of the candidates; and
   invalidating at least the portion of the sample from being used for performing at least some measurements upon the sample, includes invalidating at least the portion of the sample from being used for performing at least some measurements upon the sample at least partially based upon a relationship between the count of platelet candidates and the count of validated platelet candidates.

In some applications:
   identifying, within the microscopic image, candidates of a given entity within the blood sample includes identifying, within the microscopic image, white blood cell candidates within the blood sample;
   validating at least some of the candidates as being the given entity, by performing further analysis of the candidates includes validating at least some of the white blood cell candidates as being white blood cells, by performing further analysis of the candidates; and
   invalidating at least the portion of the sample from being used for performing at least some measurements upon the sample, includes invalidating at least the portion of the sample from being used for performing at least some measurements upon the sample at least partially based upon a relationship between the count of white blood cell candidates and the count of validated white blood cell candidates.

In some applications, invalidating at least the portion of the sample from being used for performing at least some measurements upon the sample includes invalidating at least the portion of the sample from being used for performing at least some measurements upon the sample based a ratio of the count of validated candidates to the count of candidates exceeding a maximum threshold.

In some applications, invalidating at least the portion of the sample from being used for performing at least some measurements upon the sample includes invalidating at least the portion of the sample from being used for performing at least some measurements upon the sample based a ratio of the count of validated candidates to the count of candidates and being less than minimum threshold.

There is further provided, in accordance with some applications of the present invention, a method including:
- placing at least a portion of a blood sample within a sample chamber;
- acquiring microscopic images of the portion of the blood sample;
- identifying, within the microscopic image, white blood cell candidates within the blood sample;
- validating at least some of the white blood cell candidates as being given types of white blood cells, by performing further analysis of the white blood cell candidates;
- comparing a count of the white blood cell candidates to a count of the white blood cell candidates validated as being the given types of white blood cells; and
- invalidating at least the portion of the sample from being used for performing at least some measurements upon the sample, at least partially based upon a relationship between the count of the white blood cell candidates and the count of the white blood cell candidates validated as being given types of white blood cells.

There is further provided, in accordance with some applications of the present invention, a method including:
- staining a blood sample with one or more stains;
- acquiring at least one microscopic image of the blood sample;
- identifying contaminating bodies within the sample by identifying stained objects having irregular shapes;
- performing a count of one or more entities disposed within the sample, by performing microscopic analysis upon the sample; and
- invalidating regions of the sample disposed within given distances from the identified contaminating bodies from being included in the count.

In some applications, staining the blood sample with one or more stains includes staining the blood sample with acridine orange and with a Hoechst reagent, and identifying the debris includes identifying stained objects having irregular shapes and that are stained by both the acridine orange and the Hoechst reagent.

There is further provided, in accordance with some applications of the present invention, a method including:
- placing at least a portion of a blood sample within a sample chamber;
- performing optical measurements upon the sample;
- based upon the optical measurements determining that one or more air bubbles are present within the sample chamber;
- generating an output at least partially based upon determining that the one or more air bubbles are present within the sample chamber.

In some applications, the method further includes determining one or more parameters of the sample based upon the optical measurements, and invalidating at least some of the optical measurements from being used to determine the one or more parameters of the sample, based upon determining that the one or more air bubbles are present within the chamber.

In some applications, generating the output includes invalidating the portion of the blood sample from being used to perform at least some measurements upon the sample, based upon determining that the one or more air bubbles are present within the sample chamber.

In some applications, determining that one or more air bubbles are present within the sample chamber includes analyzing an optical absorption profile of the sample along a given direction along the sample chamber.

In some applications, performing optical measurements upon the sample includes performing one or more optical absorption measurements at a wavelength at which hemoglobin does not absorb light, and determining that one or more air bubbles are present within the sample chamber includes analyzing the one or more optical absorption measurements at a wavelength at which hemoglobin does not absorb light.

There is further provided, in accordance with some applications of the present invention, a method including:
- placing at least a portion of a blood sample within a sample chamber that is a cavity that includes a base surface;
- allowing the cells in the cell suspension to settle on the base surface of the carrier to form a monolayer of cells on the base surface of the carrier;
- acquiring at least one microscope image of at least a portion of the monolayer of cells;
- identifying, within the microscopic image, a region in which the sample is not present; and
- invalidating at least the identified region from being used in microscopic analysis of the portion of the sample.

In some applications, identifying the region in which the sample is not present includes identifying an interface between a wet region and a dry region upon the base surface of the sample chamber.

In some applications, identifying the region in which the sample is not present includes distinguishing between the region in which the sample is not present and one or more regions in which the sample is present and the sample has a low cell density.

There is further provided, in accordance with some applications of the present invention, a method including:
- placing at least a portion of a blood sample within a sample chamber that is a cavity that includes a base surface and a top cover;
- allowing the cells in the cell suspension to settle on the base surface of the carrier to form a monolayer of cells on the base surface of the carrier;
- acquiring at least one microscope image of at least a portion of the monolayer of cells, while the microscope is focused on a monolayer focal plane, the portion of the monolayer of cells being disposed within the monolayer focal plane;
- identifying that dirt is disposed on the top cover or on an underside of the base surface by identifying a region in which an entity is visible at a focal plane that is different from the monolayer focal plane; and
- invalidating at least the identified region from being used in microscopic analysis of the portion of the sample.

There is further provided, in accordance with some applications of the present invention, a method including:
- placing at least a portion of a blood sample within a sample chamber that is a cavity that includes a base surface and a top cover;
- allowing the cells in the cell suspension to settle on the base surface of the carrier to form a monolayer of cells on the base surface of the carrier;
- acquiring at least one microscope image of at least a portion of the monolayer of cells, while the microscope is focused on a monolayer focal plane, the portion of the monolayer of cells being disposed within the monolayer focal plane;
- by identifying a region in which a background intensity of the microscope image is indicative of dirt is disposed on the top cover or on an underside of the base surface; and invalidating at least the identified region from being used in microscopic analysis of the portion of the sample.

There is further provided, in accordance with some applications of the present invention, a method including:

staining at least a portion of a blood sample with a fluorescent stain;

identifying stained cells within the blood sample, by acquiring a plurality of fluorescent microscope images of the portion of the blood sample using a microscopy unit, by illuminating the portion of the sample with a light source that emits light at a given spectral band;

identifying one or more fluorescent regions that are visible within a microscopic image that that is acquired under lighting by the light source, other than the stained cells; and determining a characteristic of the light source, based upon the identified fluorescent regions.

In some applications, determining the characteristic of the light source, based upon the identified fluorescent regions includes determining whether a spatial distribution of the illumination by the fluorescent light source has changed since a previous measurement.

In some applications, determining the characteristic of the light source, based upon the identified fluorescent regions includes determining whether a spatial uniformity of the illumination by the fluorescent light source has changed since a previous measurement.

In some applications, determining the characteristic of the light source, based upon the identified fluorescent regions includes determining whether a spatial location of the illumination by the fluorescent light source has changed since a previous measurement.

In some applications, determining the characteristic of the light source, based upon the identified fluorescent regions includes determining whether vignette effects of the illumination by the fluorescent light source has changed since a previous measurement.

In some applications, determining the characteristic of the light source, based upon the identified fluorescent regions includes determining whether a spectral distribution of the illumination by the fluorescent light source has changed since a previous measurement.

In some applications, determining the characteristic of the light source, based upon the identified fluorescent regions includes determining whether an intensity of the illumination by the fluorescent light source has changed since a previous measurement.

In some applications, the method further includes determining a parameter of the blood sample by performing measurements upon the stained cells and normalizing the measurements based upon the determined characteristic of the light source.

In some applications, the method further includes invalidating at least some measurements from being performed upon the blood sample, based upon the determined characteristic of the light source.

In some applications, identifying one or more fluorescent regions that are visible within a microscopic image that that is acquired under lighting by the light source other than the stained cells includes identifying intercellular regions within the blood sample.

In some applications, identifying one or more fluorescent regions that are visible within a microscopic image that that is acquired under lighting by the light source other than the stained cells includes identifying one or more fluorescent regions of the microscopy unit.

In some applications, acquiring the plurality of fluorescent microscope images of the portion of the blood sample includes acquiring the plurality of fluorescent microscope images of the portion of the blood sample while the blood sample is housed in a sample carrier, and identifying one or more fluorescent regions that are visible within a microscopic image that that is acquired under lighting by the light source other than the stained cells includes identifying one or more fluorescent regions of the sample carrier.

In some applications, the sample carrier includes glass and plastic layers that are coupled to each other via a pressure-sensitive adhesive that fluoresces, and identifying one or more fluorescent regions that are visible within a microscopic image that that is acquired under lighting by the light source other than the stained cells includes identifying the pressure-sensitive adhesive.

There is further provided, in accordance with some applications of the present invention, a method including:

staining at least a portion of a blood sample with a fluorescent stain;

identifying stained cells within the blood sample, by acquiring a plurality of fluorescent microscope images of the portion of the blood sample, by illuminating the portion of the sample with a light source that emits light at a given spectral band;

identifying one or more fluorescent regions that are visible within a microscopic image that that is acquired under lighting by the light source, other than the stained cells; and normalizing fluorescence of the stained cells, based upon the identified fluorescent regions.

In some applications, identifying one or more fluorescent regions that are visible within a microscopic image that that is acquired under lighting by the light source other than the stained cells includes identifying intercellular regions within the blood sample.

In some applications, identifying one or more fluorescent regions that are visible within a microscopic image that that is acquired under lighting by the light source other than the stained cells includes identifying one or more fluorescent regions of the microscopy unit.

In some applications, acquiring the plurality of fluorescent microscope images of the portion of the blood sample includes acquiring the plurality of fluorescent microscope images of the portion of the blood sample while the blood sample is housed in a sample carrier and identifying one or more fluorescent regions that are visible within a microscopic image that that is acquired under lighting by the light source other than the stained cells includes identifying one or more fluorescent regions of the sample carrier.

In some applications, the sample carrier includes glass and plastic layers that are coupled to each other via a pressure-sensitive adhesive that fluoresces, and identifying one or more fluorescent regions that are visible within a microscopic image that that is acquired under lighting by the light source other than the stained cells includes identifying the pressure-sensitive adhesive.

There is further provided, in accordance with some applications of the present invention, a method including:

identifying entities within a blood sample, by acquiring a plurality of brightfield microscope images of at least a portion of the blood sample, by illuminating the portion of the blood sample with light from a brightfield light source;

analyzing brightfield regions of light emitted by the brightfield light source in an absence of a blood sample; and determining a characteristic of the brightfield light source, based upon analyzing the brightfield regions of light.

In some applications, determining the characteristic of the light source, based upon the identified brightfield regions includes determining whether a spatial distribution of the illumination by the brightfield light source has changed since a previous measurement.

In some applications, determining the characteristic of the light source includes determining whether a spatial uniformity of the illumination by the brightfield light source has changed since a previous measurement.

In some applications, determining the characteristic of the light source includes determining whether a spatial location of the illumination by the brightfield light source has changed since a previous measurement.

In some applications, determining the characteristic of the light source includes determining whether vignette effects of the illumination by the brightfield light source has changed since a previous measurement.

In some applications, determining the characteristic of the light source includes determining whether a spectral distribution of the illumination by the brightfield light source has changed since a previous measurement.

In some applications, determining the characteristic of the light source includes determining whether an intensity of the illumination by the brightfield light source has changed since a previous measurement.

In some applications, analyzing brightfield regions of light emitted by the brightfield light source in an absence of a blood sample includes periodically analyzing brightfield regions of light emitted by the brightfield light source in the absence of the blood sample at fixed intervals of time.

In some applications, analyzing brightfield regions of light emitted by the brightfield light source in an absence of a blood sample includes analyzing brightfield regions of light emitted by the brightfield light source subsequent to a given number of blood sample having been imaged using the brightfield light source.

In some applications, the method further includes determining a parameter of the blood sample by performing measurements upon the entities within the blood sample and normalizing the measurements based upon the determined characteristic of the brightfield light source.

In some applications, the method further includes invalidating at least some measurements from being performed upon the blood sample, based upon the determined characteristic of the brightfield light source.

There is further provided, in accordance with some applications of the present invention, a method including:

staining portions of respective blood samples with at least one type of fluorescent stain;

using a microscopy unit, acquiring fluorescent microscopic images of the portions of the respective blood samples, by illuminating the portion of the sample with a plurality of light sources, each of which emits light at a respective spectral band;

detecting that there is an error in at least some of the microscopic images; and classifying a source of the error, by:

in response to detecting that the error was introduced from a given point in time, identifying the fluorescent stain as being the source of the error;

in response to detecting that the error gradually increased over time, identifying dirt within the microscopy unit as being the source of the error; and in response to detecting that the error is present only in images acquired under illumination by a given one of the light sources, identifying the given one of the light sources as being the source of the error.

The present invention will be more fully understood from the following detailed description of embodiments thereof, taken together with the drawings, in which:

DETAILED DESCRIPTION OF EMBODIMENTS

Figure 1:
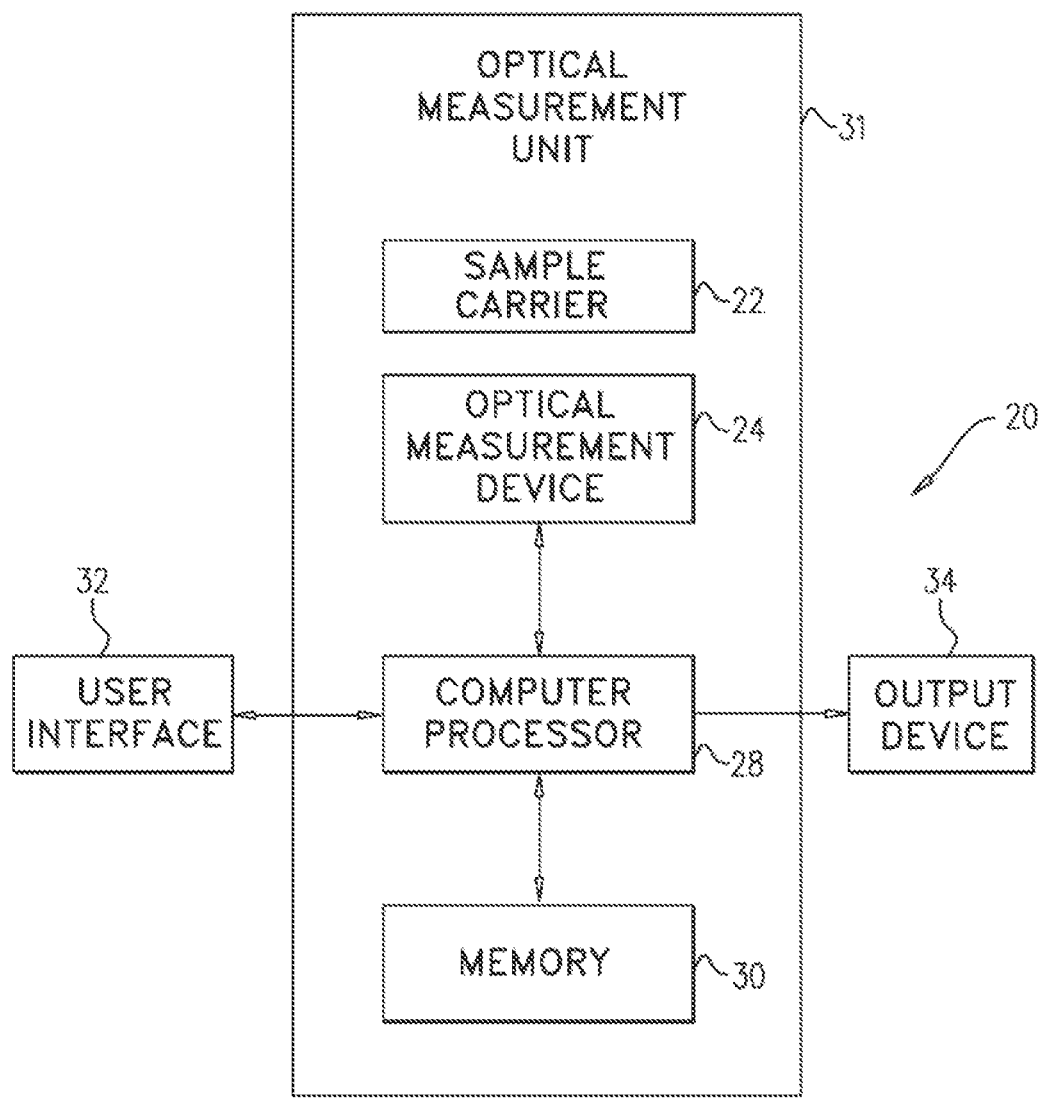
FIG. 1 is a block diagram showing components of a biological sample analysis system, in accordance some applications of the present invention.

Reference is now made to FIG. 1, which is block diagram showing components of a biological sample analysis system 20, in accordance with some applications of the present invention. Typically, a biological sample (e.g., a blood sample) is placed into a sample carrier 22. While the sample is disposed in the sample carrier, optical measurements are performed upon the sample using one or more optical measurement devices 24. For example, the optical measurement devices may include a microscope (e.g., a digital microscope), a spectrophotometer, a photometer, a spectrometer, a camera, a spectral camera, a hyperspectral camera, a fluorometer, a spectrofluorometer, and/or a photodetector (such as a photodiode, a photoresistor, and/or a phototransistor). For some applications, the optical measurement devices include dedicated light sources (such as light emitting diodes, incandescent light sources, etc.) and/or optical elements for manipulating light collection and/or light emission (such as lenses, diffusers, filters, etc.). For some applications, a microscope system is used that is generally similar to the microscope system described in US 2014/0347459 to Greenfield, which is incorporated herein by reference.

A computer processor 28 typically receives and processes optical measurements that are performed by the optical measurement device. Further typically, the computer processor controls the acquisition of optical measurements that are performed by the one or more optical measurement devices. The computer processor communicates with a memory 30. A user (e.g., a laboratory technician, or an individual from whom the sample was drawn) sends instructions to the computer processor via a user interface 32. For some applications, the user interface includes a keyboard, a mouse, a joystick, a touchscreen device (such as a smartphone or a tablet computer), a touchpad, a trackball, a voice-command interface, and/or other types of user interfaces that are known in the art. Typically, the computer processor generates an output via an output device 34. Further typically, the output device includes a display, such as a monitor, and the output includes an output that is displayed on the display. For some applications, the processor generates an output on a different type of visual, text, graphics, tactile, audio, and/or video output device, e.g., speakers, headphones, a smartphone, or a tablet computer. For some applications, user interface 32 acts as both an input interface and an output interface, i.e., it acts as an input/output interface. For some applications, the processor generates an output on a computer-readable medium (e.g., a non-transitory computer-readable medium), such as a disk, or a portable USB drive, and/or generates an output on a printer.

For some applications, optical measurement device 24 (and/or computer processor 28 and memory 30) is housed inside an optical measurement unit 31. In order to perform the optical measurements upon the sample, sample carrier 22 is placed inside the optical measurement unit. Typically, the optical measurement unit includes microscope system configured to perform microscopic imaging of a portion of the sample. For some applications, the microscope system includes a set of brightfield light sources (e.g. light emitting diodes) that are configured to be used for brightfield imaging of the sample, a set of fluorescent light sources (e.g. light emitting diodes) that are configured to be used for fluorescent imaging of the sample, and a camera (such as a CCD camera or a CMOS camera) configured to image the sample. Typically, the optical measurement unit also includes an optical-density-measurement unit configured to perform optical density measurements (e.g., optical absorption measurements) on a second portion of the sample. For some applications, the optical-density-measurement unit includes set of optical-density-measurement light sources (e.g., light emitting diodes) and light detectors, which are configured for performing optical density measurements on the sample. For some applications, each of the aforementioned sets of light sources (i.e., the set of brightfield light sources, the set of fluorescent light sources, and the set optical-density-measurement light sources) includes a plurality of light sources (e.g. a plurality of light emitting diodes), each of which is configured to emit light at a respective wavelength or at a respective band of wavelengths.

Figure 2A:
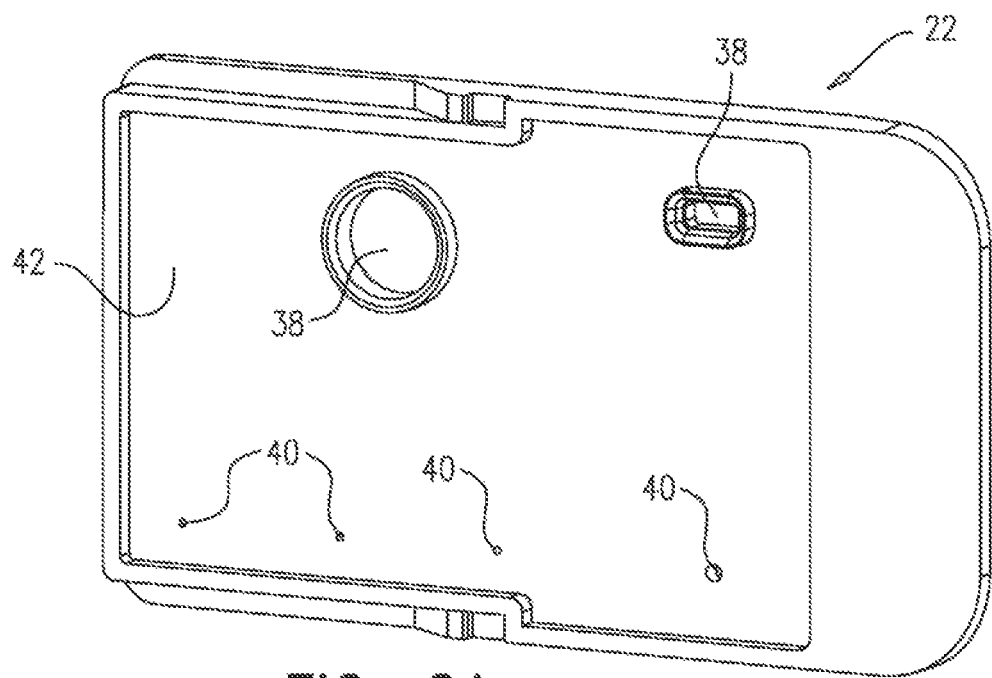
FIGS. 2A, 2B, and 2C are schematic illustrations of respective views of a sample carrier that is used for performing both microscopic measurements and optical density measurements, in accordance with some applications of the present invention.
Figure 2B:
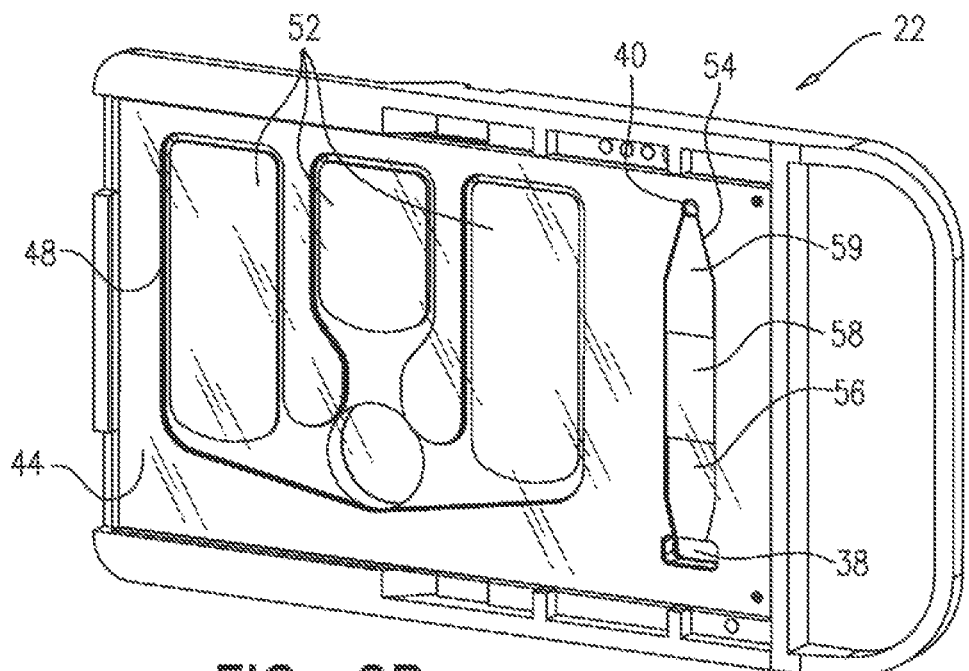

Reference is now made to FIGS. 2A and 2B, which are schematic illustrations of respective views of sample carrier 22, in accordance with some applications of the present invention. FIG. 2A shows a top view of the sample carrier (the top cover of the sample carrier being shown as being opaque in FIG. 2A, for illustrative purposes), and FIG. 2B shows a bottom view (in which the sample carrier has been rotated around its short edge with respect to the view shown in FIG. 2A). Typically, the sample carrier includes a first set 52 of one or more chambers, which are used for performing microscopic analysis upon the sample, and a second set 54 of one or more chambers, which are used for performing optical density measurements upon the sample. Typically, the chambers of the sample carrier are filled with a bodily sample, such as blood via sample inlet holes 38. For some applications, the chambers define one or more outlet holes 40. The outlet holes are configured to facilitate filling of the chambers with the bodily sample, by allowing air that is present in the chambers to be released from the chambers. Typically, as shown, the outlet holes are located longitudinally opposite the inlet holes (with respect to a sample chamber of the sample carrier). For some applications, the outlet holes thus provide a more efficient mechanism of air escape than if the outlet holes were to be disposed closer to the inlet holes.

Figure 2C:
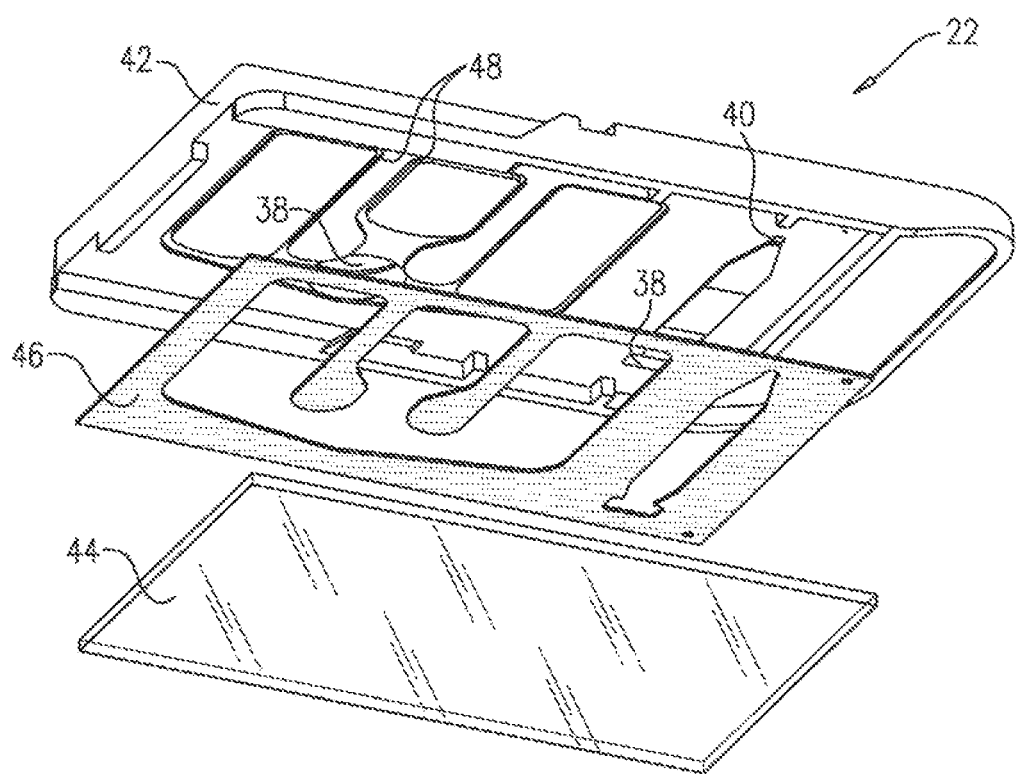

Reference is made to FIG. 2C, which shows an exploded view of sample carrier 22, in accordance with some applications of the present invention. For some applications, the sample carrier includes at least three components: a molded component 42, a glass sheet 44, and an adhesive layer 46 configured to adhere the glass sheet to an underside of the molded component. The molded component is typically made of a polymer (e.g., a plastic) that is molded (e.g., via injection molding) to provide the chambers with a desired geometrical shape. For example, as shown, the molded component is typically molded to define inlet holes 38, outlet holes 40, and gutters 48 which surround the central portion of each of the chambers. The gutters typically facilitate filling of the chambers with the bodily sample, by allowing air to flow to the outlet holes, and/or by allowing the bodily sample to flow around the central portion of the chamber.

For some applications, a sample carrier as shown in FIGS. 2A-C is used when performing a complete blood count on a blood sample. For some applications, a first portion of the blood sample is placed inside first set 52 of chambers (which are used for performing microscopic analysis upon the sample), and a second portion of the blood sample is placed inside second set 54 of chambers (which are used for performing optical density measurements upon the sample). For some applications, first set 52 of chambers includes a plurality of chambers, while second set 54 of chambers includes only a single chamber, as shown. However, the scope of the present applications includes using any number of chambers (e.g., a single chamber or a plurality of chambers) within either the first set of chambers or within the second set of chambers, or any combination thereof. The first portion of the blood sample is typically diluted with respect to the second portion of the blood sample. For example, the diluent may contain pH buffers, stains, fluorescent stains, antibodies, sphering agents, lysing agents, etc. Typically, the second portion of the blood sample, which is placed inside second set 54 of chambers is a natural, undiluted blood sample. Alternatively or additionally, the second portion of the blood sample may be a sample that underwent some modification, including, for example, one or more of dilution (e.g., dilution in a controlled fashion), addition of a component or reagent, or fractionation.

For some applications, one or more staining substances are used to stain the first portion of the blood sample (which is placed inside first set 52 of chambers) before the sample is imaged microscopically. For example, the staining substance may be configured to stain DNA with preference over staining of other cellular components. Alternatively, the staining substance may be configured to stain all cellular nucleic acids with preference over staining of other cellular components. For example, the sample may be stained with acridine orange reagent, Hoechst reagent, and/or any other staining substance that is configured to preferentially stain DNA and/or RNA within the blood sample. Optionally, the staining substance is configured to stain all cellular nucleic acids but the staining of DNA and RNA are each more prominently visible under some lighting and filter conditions, as is known, for example, for acridine orange. Images of the sample may be acquired using imaging conditions that allow detection of cells (e.g., brightfield) and/or imaging conditions that allow visualization of stained bodies (e.g. appropriate fluorescent illumination). Typically, the first portion of the sample is stained with acridine orange and with a Hoechst reagent. For example, the first (diluted) portion of the blood sample may be prepared using techniques as described in US 2015/0316477 to Pollak, which is incorporated herein by reference, and which describes a method for preparation of blood samples for analysis that involves a dilution step, the dilution step facilitating the identification and/or counting of components within microscopic images of the sample.

Typically, prior to being imaged microscopically, the first portion of blood (which is placed in first set 52 of chambers) is allowed to settle such as to form a monolayer of cells, e.g., using techniques as described in U.S. Pat. No. 9,329,129 to Pollak, which is incorporated herein by reference. For some applications, the microscopic analysis of the first portion of the blood sample is performed with respect to the monolayer of cells. Typically, the first portion of the blood sample is imaged under brightfield imaging, i.e., under illumination from one or more light sources (e.g., one or more light emitting diodes, which typically emit light at respective spectral bands). Further typically, the first portion of the blood sample is additionally imaged under fluorescent imaging. Typically, the fluorescent imaging is performed by exciting stained objects (i.e., objects that have absorbed the stain(s)) within the sample by directing light toward the sample at known excitation wavelengths (i.e., wavelengths at which it is known that stained objects emit fluorescent light if excited with light at those wavelengths), and detecting the fluorescent light. Typically, for the fluorescent imaging, a separate set of light sources (e.g., one or more light emitting diodes) is used to illuminate the sample at the known excitation wavelengths.

It is noted that, in the context of the present application, the term monolayer is used to mean a layer of cells that have settled, such as to be disposed within a single focus field of the microscope. Within the monolayer there may be some overlap of cells, such that within certain areas there are two or more overlapping layers of cells. For example, red blood cells may overlap with each other within the monolayer, and/or platelets may overlap with, or be disposed above, red blood cells within the monolayer.

As described with reference to US 2019/0302099 to Pollack, which is incorporated herein by reference, for some applications, chambers belonging to set 52 (which is used for microscopy measurements) have different heights from each other, in order to facilitate different measurands being measured using microscope images of respective chambers, and/or different chambers being used for microscopic analysis of respective sample types. For example, if a blood sample, and/or a monolayer formed by the sample, has a relatively low density of red blood cells, then measurements may be performed within a chamber of the sample carrier having a greater height (i.e., a chamber of the sample carrier having a greater height relative to a different chamber having a relatively lower height), such that there is a sufficient density of cells, and/or such that there is a sufficient density of cells within the monolayer formed by the sample, to provide statistically reliable data. Such measurements may include, for example red blood cell density measurements, measurements of other cellular attributes, (such as counts of abnormal red blood cells, red blood cells that include intracellular bodies (e.g., pathogens, Howell-Jolly bodies), etc.), and/or hemoglobin concentration. Conversely, if a blood sample, and/or a monolayer, formed by the sample, has a relatively high density of red blood cells, then such measurements may be performed upon a chamber of the sample carrier having a relatively low height, for example, such that there is a sufficient sparsity of cells, and/or such that there is a sufficient sparsity of cells within the monolayer of cells formed by the sample, that the cells can be identified within microscopic images. For some applications, such methods are performed even without the variation in height between the chambers belonging to set 52 being precisely known.

For some applications, based upon the measurand that is being measured, the chamber within the sample carrier upon which to perform optical measurements is selected. For example, a chamber of the sample carrier having a greater height may be used to perform a white blood cell count (e.g., to reduce statistical errors which may result from a low count in a shallower region), white blood cell differentiation, and/or to detect more rare forms of white blood cells. Conversely, in order to determine mean corpuscular hemoglobin (MCH), mean corpuscular volume (MCV), red blood cell distribution width (RDW), red blood cell morphologic features, and/or red blood cell abnormalities, microscopic images may be obtained from a chamber of the sample chamber having a relatively low height, since in such chambers the cells are relatively sparsely distributed across the area of the region, and/or form a monolayer in which the cells are relatively sparsely distributed. Similarly, in order to count platelets, classify platelets, and/or extract any other attributes (such as volume) of platelets, microscopic images may be obtained from a chamber of the sample chamber having a relatively low height, since within such chambers there are fewer red blood cells which overlap (fully or partially) with the platelets in microscopic images, and/or in a monolayer.

In accordance with the above-described examples, it is preferable to use a chamber of the sample carrier having a lower height for performing optical measurements for measuring some measurands within a sample (such as a blood sample), whereas it is preferable to use a chamber of the sample carrier having a greater height for performing optical measurements for measuring other measurands within such a sample. Therefore, for some applications, a first measurand within a sample is measured, by performing a first optical measurement upon (e.g., by acquiring microscopic images of) a portion of the sample that is disposed within a first chamber belonging to set 52 of the sample carrier, and a second measurand of the same sample is measured, by performing a second optical measurement upon (e.g., by acquiring microscopic images of) a portion of the sample that is disposed within a second chamber of set 52 of the sample carrier. For some applications, the first and second measurands are normalized with respect to each other, for example, using techniques as described in US 2019/0145963 to Zait, which is incorporated herein by reference.

Typically, in order to perform optical density measurements upon the sample, it is desirable to know the optical path length, the volume, and/or the thickness of the portion of the sample upon which the optical measurements were performed, as precisely as possible. Typically, an optical density measurement is performed on the second portion of the sample (which is typically placed into second set 54 of chambers in an undiluted form). For example, the concentration and/or density of a component may be measured by performing optical absorption, transmittance, fluorescence, and/or luminescence measurements upon the sample.

Referring again to FIG. 2A, for some applications, chambers belonging to set 54 (which is used for optical density measurements), typically define at least a first region 56 (which is typically deeper) and a second region 58 (which is typically shallower), the height of the chambers varying between the first and second regions in a predefined manner, e.g., as described in WO 17/195205 to Pollack, which is incorporated herein by reference. The heights of first region 56 and second region 58 of the sample chamber are defined by a lower surface that is defined by the glass sheet and by an upper surface that is defined by the molded component. The upper surface at the second region is stepped with respect to the upper surface at the first region. The step between the upper surface at the first and second regions, provides a predefined height difference Δh between the regions, such that even if the absolute height of the regions is not known to a sufficient degree of accuracy (for example, due to tolerances in the manufacturing process), the height difference Δh is known to a sufficient degree of accuracy to determine a parameter of the sample, using the techniques described herein, and as described in US 2019/0302099 to Pollack, which is incorporated herein by reference. For some applications, the height of the chamber varies from the first region 56 to the second region 58, and the height then varies again from the second region to a third region 59, such that, along the sample chamber, first region 56 define a maximum height region, second region 58 defines a medium height region, and third region 59 defines a minimum height region. For some applications, additional variations in height occur along the length of the chamber, and/or the height varies gradually along the length of the chamber.

As described hereinabove, while the sample is disposed in the sample carrier, optical measurements are performed upon the sample using one or more optical measurement devices 24. Typically, the sample is viewed by the optical measurement devices via the glass layer, glass being transparent at least to wavelengths that are typically used by the optical measurement device. Typically, the sample carrier is inserted into optical measurement unit 31, which houses the optical measurement device while the optical measurements are performed. Typically, the optical measurement unit houses the sample carrier such that the molded layer is disposed above the glass layer, and such that the optical measurement unit is disposed below the glass layer of the sample carrier and is able to perform optical measurements upon the sample via the glass layer. The sample carrier is formed by adhering the glass sheet to the molded component. For example, the glass sheet and the molded component may be bonded to each other during manufacture or assembly (e.g. using thermal bonding, solvent-assisted bonding, ultrasonic welding, laser welding, heat staking, adhesive, mechanical clamping and/or additional substrates). For some applications, the glass layer and the molded component are bonded to each other during manufacture or assembly using adhesive layer 46. For some applications, due to tolerances in the manufacturing process, the absolute heights of the sample chambers are not known. As described above, the step between the upper surface at the first and second regions, provides a predefined height difference Δh between the regions, such that even if the absolute height of the regions is not known to a sufficient degree of accuracy (for example, due to tolerances in the manufacturing process), the height difference Δh is known to a sufficient degree of accuracy to determine a parameter of the sample. Alternative or additional variations in height (e.g., stepped variations in height or gradual variations in height) along the length of the chamber may be used as an alternative or in addition to the step between the first and second regions, for example, using the techniques described herein, and as described in US 2019/0302099 to Pollack, which is incorporated herein by reference.

For some applications, a portion of sample carrier 22 is configured to fluoresce, at least under certain conditions. For example, the portion of the sample carrier may be configured to fluoresce when exposed to light emitted by optical measurement device 24 (e.g., brightfield light or fluorescent light that is emitted by a microscope system). Or the portion of the sample carrier may be configured to fluoresce when placed within optical measurement unit 31 in which optical measurement device 24 is housed. As described hereinabove, for some applications, sample carrier 22 includes adhesive layer 46. For some applications, the adhesive layer, or a portion thereof, is configured to fluoresce in the above-described manner (e.g., by an adhesive material within the adhesive layer being configured to fluoresce, by the adhesive layer containing an additional material that is configured to fluoresce, and/or by the adhesive layer being coated with such a material). For some applications, the adhesive layer is a pressure-sensitive adhesive, at least a portion of which is configured to fluoresce. For example, the pressure-sensitive adhesive may be an acrylic-based pressure-sensitive adhesive, at least a portion of which is configured to fluoresce.

In accordance with some applications of the present invention, various techniques are performed (typically by the computer processor), in order to determine whether various errors have occurred, and optionally to identify the source of the error if an error has occurred. Such errors may result from the preparation of all of the sample. For example, the sample may have been left in the sample carrier for too long before the measurements were performed (which may result in the sample become degraded, and/or which may result in stains that were mixed with one or both portions of the sample from becoming overly-absorbed by entities within the sample). Alternatively, errors may result from the preparation of a particular one of the portions of the sample. For example, there may have been an error in the preparation of the first portion (which is typically diluted and is placed within the first set 52 of chambers to be analyzed microscopically), such as an error in the dilution of the first portion of the sample, entry of air bubbles into the first set 52 of chambers or contamination of that portion of the sample. Alternatively or additionally, there may have been an error in the preparation of the second portion (which is typically undiluted and is placed within the second set 54 of chambers to be analyzed via optical density measurements), such as contamination of that portion, or entry of air bubbles into the second set 54 of chambers.

Alternatively or additionally, errors may result from an error with the sample carrier (such as the material of the sample carrier itself (e.g., the substrate) being unclean, and/or dirt or spilled blood on the sample carrier), and/or an error with the microscope system itself, such as lighting (e.g., a light emitting diode that used for the brightfield imaging, and/or a light emitting diode that is used during fluorescent imaging of the sample), and/or errors associated with the optical path, and/or motor and stage components or controllers, and/or errors resulting from the environment in which the device is placed (such as, relative humidity, temperature, pressure, particulate concentration, or any other environmental factor). Further alternatively or additionally, there may be an inherent problem with the sample (such as a very low count or a very high count of a certain entity, or too much time having elapsed since the sample collection was performed), which means that the computer processor is unable to perform certain measurements with a sufficient degree of accuracy, and/or which means that the computer processor should flag this to the user.

For some applications, in response to identifying an error, the computer processor outputs a message indicating the error and/or indicating the source of the error. For some applications, the computer processor does not perform certain measurements upon the blood sample in response to identifying an error. For some applications, in response to identifying the error, the computer processor does not perform any measurements on the sample, and/or flags that the sample is invalid to the user, and/or instructs the user to repeat the sample preparation with a new test kit and/or to re-collect the blood sample. Alternatively or additionally, certain parameters of the blood sample are determined by the computer processor by calibrating measurements that are performed upon the blood sample, in order to account for the error.

For some applications, one or more of the following errors is accounted for, e.g., in one or more of the above-described ways:

Errors in the microscopy device, such as:
steps-loss in a motor that moves the microscope stage
changes in backlash of the movement of the microscope stage (e.g., as described in further detail hereinbelow)
changes in timing between the microscope camera and the microscope stage (e.g., as described in further detail hereinbelow)
alignment between microscope camera and the microscope stage (e.g., due to relative rotation between these elements)
issues with the optical system (for example, changes in focus quality over time, e.g., caused by samples, or caused by a piece of the microscope stage (e.g., a scratched piece), e.g., as described in further detail hereinbelow)
levelling changes in the microscope system
change in expected focus location along the z-axis (i.e., the optical axis)
loss of communication between elements
changes in the camera linear response
Errors caused by environmental factors, such as:
device outside of allowable temperature, humidity, elevation, etc.
specific components outside of target values
General errors, caused by factors such as:
time of scan
time of device startup
available working/storage memory Some examples of the techniques for identifying errors and accounting for such errors are described hereinbelow.

As described hereinabove, typically, the first portion of the blood sample is analyzed microscopically, while disposed inside first set 52 of sample chambers. Typically, prior to being imaged microscopically, the first portion of blood (which is placed in first set 52 of chambers) is allowed to settle such as to form a monolayer of cells, e.g., using techniques as described in U.S. Pat. No. 9,329,129 to Pollak, which is incorporated herein by reference.

For some applications, the computer processor is configured to determine whether one or more cell types (e.g., red blood cells) within the sample chamber had already settled within the sample chamber, prior to the sample carrier being placed into placed into the microscopy unit by acquiring one or more microscopic images of the sample after the sample carrier has been placed into the microscopy unit, and analyzing the one or more images.

Typically, if it is determined that all of the red blood cells had already settled prior to the microscopic images being acquired, this is an indication that the blood sample was left within the sample chamber for too long prior to the sample carrier placed into the microscopy unit. It is noted that, although the analysis of the microscopic images is typically performed with respect to the monolayer of settled cells, it is nevertheless desirable that the sample carrier be placed into the microscopy unit while some red blood cells are still settling, since this indicates that the sample was not left in the sample carrier for too long, prior to being placed into the microscopy unit. Conversely, if all of the red blood cells (or a sufficiently great proportion of the red blood cells) had already settled, then the sample may have become degraded, and/or the stains may have become overly-absorbed by entities within the sample. Thus, the extent to which the cells are still settling may be used as a measure of how recently the sample was drawn from the subject and/or how recently the sample was placed in the sample carrier or sample chamber (i.e., the freshness of the sample). Therefore, for some applications, in response to determining that more than a threshold amount of red blood cells within the sample chamber had already settled within the sample chamber, prior to acquisition of the one or more microscopic images, the sample (or a portion thereof) is invalidated from being used for performing at least some measurements upon the sample.

For some applications, an indication of the age of the blood sample is determined, at least partially based upon determining whether one or more cell types within the sample chamber had already settled within the sample chamber, prior to acquisition of the one or more microscopic images. For some applications, an indication of the age of the blood sample is determined, at least partially based upon an amount (or a proportion) of one or more cell types within the sample chamber that had not yet settled within the sample chamber, prior to acquisition of the one or more microscopic images.

For some applications, a generally similar analysis to that described in the above paragraphs (for determining how recently the sample was drawn from the subject and/or how recently the sample was placed in the sample carrier or sample chamber) is performed with respect to the second portion of the sample (which is typically placed into second set 54 of chambers in an undiluted form).

It is noted that, typically, after the computer processor has determined an indication of how recently the sample was drawn from the subject and/or how recently the sample was placed in the sample carrier or sample chamber (e.g., using the above-described analysis technique), the sample carrier is left in place within the microscopy unit for several minutes (for example, between 2 and 10 minutes, e.g., approximately 5 minutes) before further imaging of the first portion of the blood sample is performed (the further imaging being performed for the purpose of microscopic analysis of the blood sample). This is in order to allow time for the first portion of the blood sample to settle into a monolayer.

For some applications, measurements that are performed upon the sample are calibrated, in response to determining that more than a threshold amount of red blood cells within the sample chamber had already settled within the sample chamber, prior to acquisition of the one or more microscopic images. For example, such measurements may be calibrated to account for an amount of staining that entities within the blood sample underwent as indicated by more than the threshold amount of red blood cells within the sample chamber having already settled within the sample chamber, prior to acquisition of the one or more microscopic images. For some applications, measurements that are performed upon the sample are calibrated, based upon an amount (or a proportion) of one or more cell types within the sample chamber that had not yet settled within the sample chamber, prior to acquisition of the one or more microscopic images.

For some applications, microscopic images of red blood cells within the blood sample are acquired, while the red blood cells within the blood sample are settling within the sample chamber, and a settling-dynamics characteristic of the blood sample (e.g., the red blood cell sedimentation rate) is determined by the computer processor by analyzing the images. Typically, the settling-dynamics characteristic of the blood sample (e.g., the red blood cell sedimentation rate) is determined by the computer processor in real-time with respect to the settling of the red blood cells (i.e., while the red blood cells are still settling). This is in contrast with other techniques for determining the settling-dynamics characteristic of the blood sample (e.g., the red blood cell sedimentation rate), in which the total time that is takes for red blood cells to settle is measured. It is noted that, if such measurements are performed on a diluted portion of the blood sample, the effect of the proteins on the settling time of the red blood cells is diluted. Therefore, for some applications, such measurements are performed on an undiluted portion of the blood sample.

For some applications, the above-described analyses for determining an indication of how recently the sample was drawn from the subject and/or how recently the sample was placed in the sample carrier and/or for determining settling-dynamics characteristics are corrected using per sample information such as red blood cell or platelet mean cell volume, mean cell hemoglobin concentration, or other such sample-indicative measures. Alternatively or additionally, the analyses for determining an indication of how recently the sample was drawn from the subject and/or how recently the sample was placed in the sample carrier and/or for determining settling-dynamics characteristics are corrected using information on a single-cell level (i.e., by extracting data relating to individual cells and correcting the determined settling-dynamics characteristics based upon these data).

For some applications, in response to determining that the concentration of a given entity within the blood sample passes a threshold, the computer processor determines a cause of the concentration of the given entity passing the threshold by comparing a parameter determined from the microscopic images of the first portion of the blood sample to a parameter determined from the optical density measurements performed on the second portion of the blood sample. For example, in response to detecting that the first portion of the sample (which is typically diluted and placed inside first set 52 of chambers) has a very high red blood cell count or a very low red blood cell count, the computer processor may perform the comparison in order to determine whether it is the case that the blood sample inherently has a very high red blood cell count or a very low red blood cell count, or whether it was caused by an error in the preparation of the portion of the sample (e.g., the dilution of the first portion). The computer processor typically determines that the blood sample itself is the cause of the concentration of the given entity within the sample passing the threshold by determining that a concentration of the entity as indicated by the microscopic images is similar to the concentration of the entity as determined from the optical density measurements. Further typically, the computer processor determines that preparation of the portion of the blood sample is the cause of the concentration of the given entity within the sample passing the threshold by determining that a concentration of the entity as indicated by the microscopic images is different from the concentration of the entity as determined from the optical density measurements.

For some applications, a similar analysis to that described in the above paragraph is performed using parameters of the sample other than concentration (e.g., mean cell volume, mean cell hemoglobin, etc.). For some applications, in response to identifying that there is a difference between parameters as measured upon the respective portions of the sample, it is determined that the respective portions of the sample are likely to be portions of two different samples (e.g., from two different patients).

For some applications, the parameters as determined from the respective portions of the sample are used to correct each other. For example, if the values of a parameter as measured in each of the sample portions are different from each other, but it is determined that there is a third value (or range of values) of the parameter that lies within the range of error for both of the values as measured in each of the sample portions, then it may be determined that the third value (or range of values) is likely to be correct.

For some applications, in response to one or more parameters of the sample being outside of the normal range, the computer processor compares these parameters to other parameters of the sample. In response to all of the parameters being outside of the normal range (or even erroneous in a manner that correlates with the error in the one or more parameters), then the computer processor may determine that this is due to an error in a calculation that affects all of these parameters.

For some applications, the computer processor is configured to identify echinocytes, spherocytes, and/or crenate red blood cells within the microscopic images of the first portion of the sample. Typically, the presence of such entities is an indication of the portion of the sample having become degraded due to age and/or sample storage conditions. For some such applications, the computer processor measures a count of such entities, and invalidates at least the portion of the blood sample from being used to perform at least some measurements upon the blood sample, at least partially based upon the count of the selected type of entity passing a threshold. For some applications, the computer processor generates an indication of the count, and/or an associated clinical condition, to a user. Alternatively or additionally, the computer processor determines an indication of an age of the portion of the sample, at least partially based upon the count. For some applications, in order to determine a parameter of the sample, a measurement is performed upon the microscopic images and the measurement is calibrated based upon the determined indication of the age of the portion of the sample, and/or based upon the count of the aforementioned entities. For some applications, a parameter of the sample is determined by performing optical density measurements upon the second portion of the blood sample (which is typically disposed inside second set 54 of sample chambers), and calibrating the optical density measurements based upon the determined indication of the age of the portion of the sample, and/or based upon the count of the aforementioned entities. (For some applications, optical density measurements are calibrated based upon one or more other factors, e.g., red blood cell morphology, red blood cell volume, count of platelets, level of debris within the sample, and/or presence or amount of any object or attribute that may affect scattering.)

For some applications, the computer processor estimates the volumes of the echinocytes, spherocytes, and/or crenate red blood cells. For some such applications, the volumes of such cells is incorporated into an overall measure of the mean red blood cell volume within the sample.

Figure 3A:
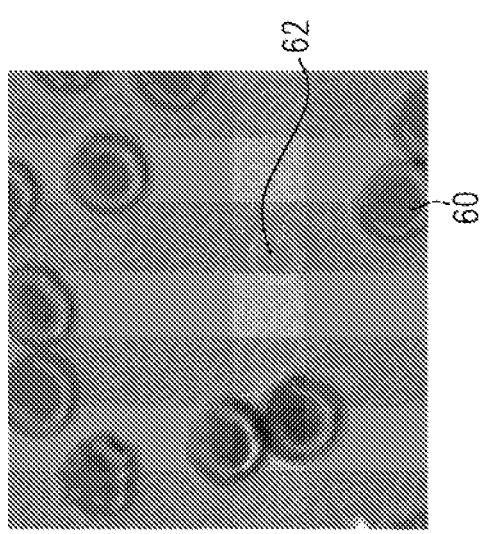
FIGS. 3A, 3B, and 3C are microscopic images of a blood sample that contains hemolyzed red blood cells, acquired in accordance with some applications of the present invention.
Figure 3B:
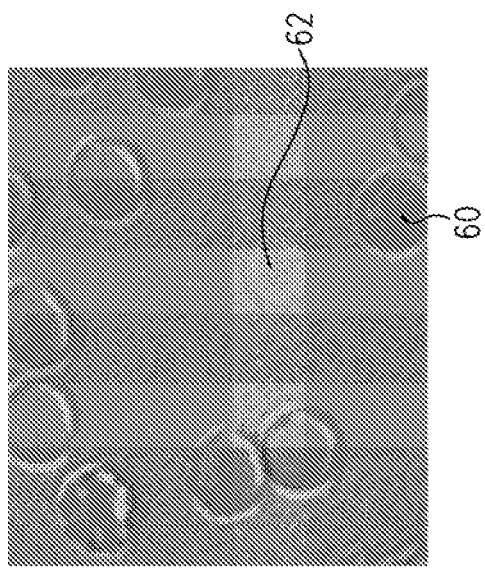

Reference is now made to FIGS. 3A and 3B, which are brightfield microscopic images, acquired, respectively, under violet and green LED illumination in accordance with some applications of the present invention. As described hereinabove, typically microscopic images of the first portion of the blood sample are acquired and a monolayer of cells within the first portion is analyzed. Typically, spherification techniques are not applied to the red blood cells in the sample prior to the portion of the sample being imaged. The inventors of the present application have discovered that when the portion of the sample is microscopically imaged using the techniques described herein, some hemolyzed red blood cells are visible in the microscopic images. Typically, after the sample is stained by Hoechst reagent (or any fluorescent or non-fluorescent stain that has affinity to the cell membrane), under brightfield imaging, the cell outline is visible, but the rest of the cell appears like the background of the image. This effect may be observed in FIGS. 3A and 3B, in which red blood cells 60 are visible, and the outlines of hemolyzed red blood cells 62 are visible, but the interior of the cells appear similar to the background, such that the outlines appear as "empty" cells. The "empty" cells typically have generally similar shapes and sizes to red blood cells.

Figure 3C:
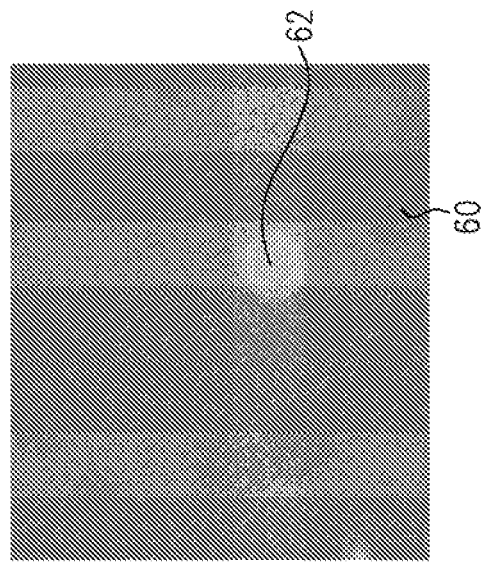

Reference is also made to FIG. 3C, which is a fluoroscopic microscopic images, acquired in accordance with some applications of the present invention. The image was recorded after a blood sample had been stained with a Hoechst reagent, and excited using UV illumination centered around approximately 360 nm. It may be observed that, unlike red blood cells 60, which appear faintly as darkened circles, the hemolyzed red blood cells 62 appear as bright circles having generally similar shapes and sizes to the red blood cells. It is hypothesized that the hemolyzed red blood cells become stained by the Hoechst reagent binding to remnants that remain on the membrane of the hemolyzed red blood cells. This gives rise to the hemolyzed red blood cells appearing as "empty" cells in the brightfield images, and/or appearing as bright circles in the fluorescent images. It is further hypothesized that the reason why the red blood cells appear as darkened circles in the fluorescent image is because there is background emission of free Hoechst reagent throughout the sample, but this emission is attenuated by the hemoglobin in the red blood cells, such that they appear darker than the background.

Therefore, in accordance with some applications of the present invention, hemolyzed red blood cells are identified within a non-spherificated blood sample. Typically, the sample is stained with a stain such as Hoechst reagent (or any fluorescent or non-fluorescent stain that has affinity to the cell membrane). The hemolyzed red blood cells are identified within brightfield images of the stained sample, by identifying cells the outlines of which are visible, but the interiors of which appear generally similar to the background (such that the outlines appear as "empty" cells). Alternatively or additionally, the hemolyzed red blood cells are identified within fluorescent images of the stained sample. Typically, the hemolyzed red blood cells have generally similar shapes and sizes to the red blood cells within the images.

For some applications, the hemolyzed red blood cells that are visible constitute only a fraction of the total number of hemolyzed red blood cells that are present within the portion of the sample, since it is typically the case that a portion of the hemolyzed red blood cells are not visible. For some applications, the computer processor identifies the visible hemolyzed red blood cells, and measures a count of the identified hemolyzed red blood cells within the portion of the sample. Typically, based upon the count of the identified hemolyzed red blood cells, the computer processor estimates a total count of hemolyzed red blood cells within the portion of the sample that is greater than the count of the identified hemolyzed red blood cells. Alternatively or additionally, based upon the count of the identified hemolyzed red blood cells, the computer processor estimates a ratio of hemolyzed red blood cells to non-hemolyzed red blood cells within the sample. Typically, this ratio is calculated by estimating a total count of hemolyzed red blood cells within the portion of the sample that is greater than the count of the identified hemolyzed red blood cells. For some applications, the computer processor outputs an indication of the estimated total count of hemolyzed red blood cells within the blood sample, or of the ratio of hemolyzed red blood cells to non-hemolyzed red blood cells, to a user. Alternatively or additionally, the computer processor invalidates the sample from being used for performing at least some measurements upon the sample, at least partially based upon the count of the identified hemolyzed red blood cells passing a threshold, or based upon the aforementioned ratio exceeding a threshold. For some applications, the invalidation of the sample is based upon estimating a total count of hemolyzed red blood cells within the portion of the sample that is greater than the count of the identified hemolyzed red blood cells.

For some applications, in order to identify a given entity within the blood sample (such as platelets, red blood cells, white blood cells, etc.) the computer processor first identifies candidates of the given entity within the blood sample, by analyzing the microscopic images of the first portion of the blood sample. Subsequently, the computer processor validates at least some of the candidates as being the given entity, by performing further analysis of the candidates.

For some applications, the computer processor compares a count of the candidates of the given entity to a count of the validated candidates of the given entity, and invalidates at least the portion of the sample from being used for performing at least some measurements upon the sample, at least partially based upon a relationship between the count of candidates and the count of validated candidates. For example, if the ratio of the count of validated candidates to the count of candidates exceeds a maximum threshold, the computer processor may invalidate at least the portion of the sample from being used for performing at least some measurements upon the sample, as this is indicative of too many candidates having been validated, indicating an error. Alternatively or additionally, if the ratio of the count of validated candidates to the count of candidates is lower than a minimum threshold, the computer processor may invalidate at least the portion of the sample from being used for performing at least some measurements upon the sample, as this is indicative of too few candidates having been validated, indicating an error. For some applications, if the ratio of the count of validated platelets to the count of platelet candidates is lower than a minimum threshold, the computer processor invalidates at least the portion of the sample from being used for performing a platelet count, as this is indicative of too few platelet candidates having been validated as platelets, indicating an error. For example, this error may be caused by debris (or other contaminating bodies) having been wrongly identified as platelets or as platelet candidates. It is noted that the source of the error may be in the preparation of the portion of the sample, in the sample carrier, in portions of the microscopy unit, and/or in the blood itself. For some applications, similar techniques are performed with respect to red blood cells, white blood cells, and/or other entities within the sample (e.g., anomalous white blood cells, circulating tumor cells, red blood cells, reticulocytes, Howell-Jolly bodies, etc.).

For some applications, the computer processor is configured to identify white blood cell candidates within the blood sample, and is then configured to validate at least some of the white blood cell candidates as being given types of white blood cells (e.g., neutrophils, lymphocytes, eosinophils, monocytes, blasts, immature cells, atypical lymphocytes, and/or basophils), by performing further analysis of the white blood cell candidates. For some applications, the computer processor compares a count of the white blood cell candidates to a count of the white blood cell candidates validated as being the given types of white blood cells, and invalidates at least the portion of the sample from being used for performing at least some measurements upon the sample, at least partially based upon a relationship between the count of the white blood cell candidates and the count of the white blood cell candidates validated as being given types of white blood cells. For example, if the ratio of the count of white blood cell candidates validated as being given types of white blood cells to the count of white blood cell candidates exceeds a maximum threshold, the computer processor may invalidate at least the portion of the sample from being used for performing at least some measurements upon the sample, as this is indicative of too many candidates having been validated, indicating an error. Alternatively or additionally, if the ratio of the count of white blood cell candidates validated as being given types of white blood cells to the count of white blood cell candidates is lower than a minimum threshold, the computer processor may invalidate at least the portion of the sample from being used for performing at least some measurements upon the sample, as this is indicative of too few candidates having been validated, indicating an error. It is noted that the source of the error may be in the preparation of the portion of the sample, in the sample carrier, in portions of the microscopy unit, and/or in the blood itself.

For some applications, the computer processor is configured to identify debris (or other contaminating bodies) within the sample, by identifying stained objects having irregular shapes (e.g., fibrous shapes, non-circular shapes, and/or elongate shapes). As described hereinabove, typically, the computer processor performs a count of one or more entities disposed within the sample, by performing microscopic analysis upon the sample. For some applications, the computer processor invalidates regions of the sample disposed within given distances from the identified debris (or other contaminating bodies) from being included in the count. Typically, debris are stained by stains, and further typically debris are stained by both acridine orange and Hoechst reagent. For some applications, the computer processor identifies the debris (or other contaminating bodies) by identifying objects that have irregular shapes and/or that are stained by a stain (e.g., by both the acridine orange and Hoechst reagent).

Figure 4:
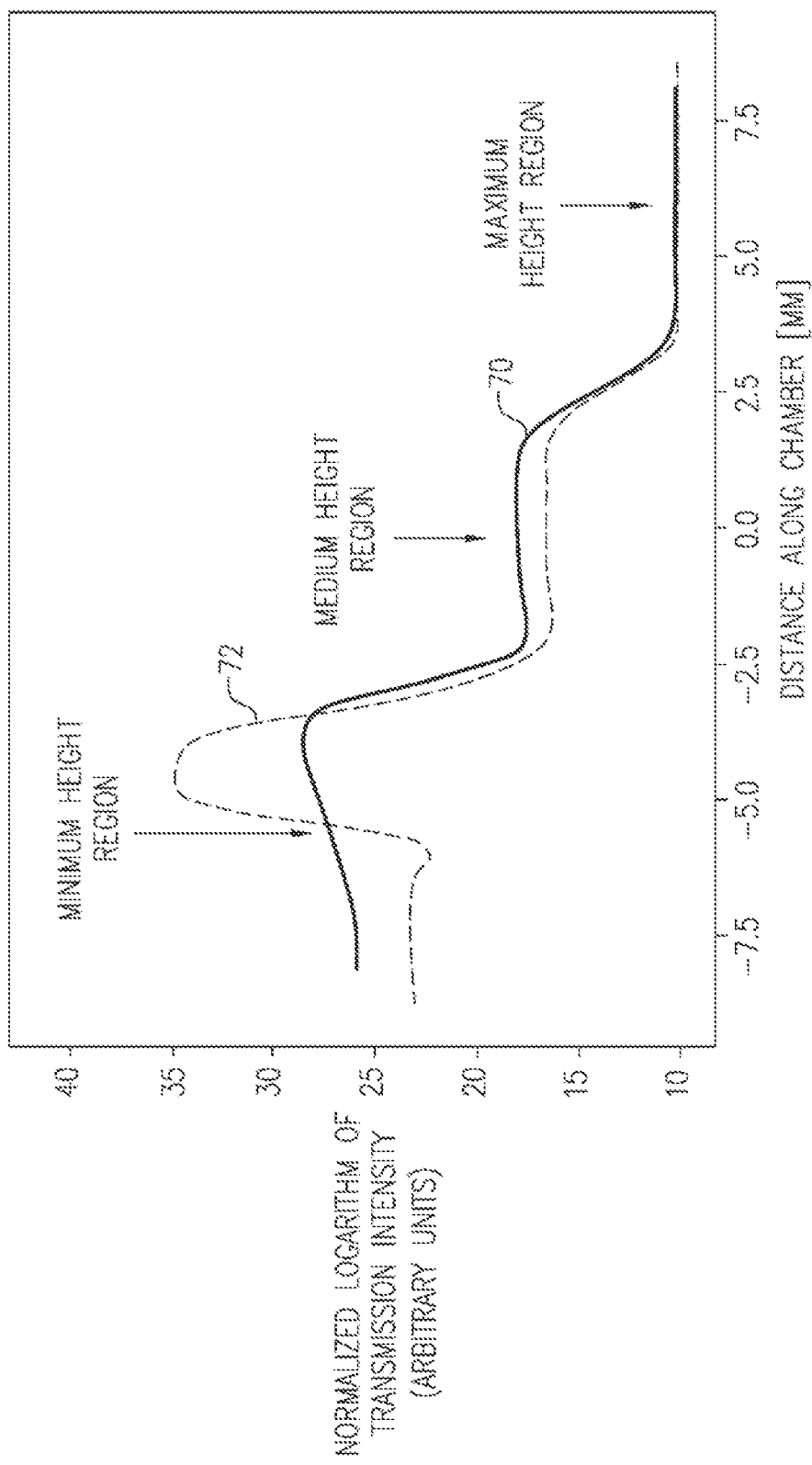
FIG. 4 is a graph showing profiles of normalized light transmission intensity recorded along the length of a sample chamber, in accordance with some applications of the present invention.

Reference is now made to FIG. 4, which is a graph showing normalized light logarithm-of-transmission-intensity profiles measured along the length of a sample chamber belonging to second set 54 of sample chambers, in accordance with some applications of the present invention. As described hereinabove, typically the computer processor is configured to perform optical measurements (e.g., optical density measurements) on the second portion of the sample, which is placed into second set 54 of sample chambers. For some applications, light (e.g. light form an LED) is transmitted through a chamber at a spectral band at which hemoglobin absorbs lights, and the intensity of the transmitted light is detected by a photodetector. The amount of light that is absorbed is interpreted to be indicative of the concentration of hemoglobin within the second portion of the sample, in accordance with the Beer-Lambert law.

For some applications, the computer processor determines that one or more air bubbles are present within one of the second set of sample chambers, based upon the optical measurements. For example, due to the regions having different heights within the sample chamber the normalized logarithm-of-transmission-intensity profile (which is related to the hemoglobin absorption profile) along the length of the chamber is expected to have a given shape, e.g., regions along which the light logarithm-of-transmission-intensity is substantially constant with differences between the regions (due to steps in the height of the chamber). This is indicated by the solid curve 70 in FIG. 4, which is a combination of the normalized logarithm-of-transmission-intensity recorded along the length of a sample chamber for several different samples. As shown, along the minimum height region 56 of the sample chamber, logarithm-of-transmission-intensity is substantially constant. (In fact, there is a slight slope along the length of this region, which is due to height variation along the length of the region due to tolerances in the manufacture of the sample carrier, as described hereinabove.) There is then a drop in the logarithm-of-transmission-intensity as the distance along the sample chamber transitions to the medium height region 58 (at which hemoglobin absorption is greater, and light transmission is therefore lower), before there is a further drop as the distance along the sample chamber transitions to the maximum height region 59 (at which hemoglobin absorption is greater still, and light transmission is therefore even lower). It is noted that the way in which the transmission was normalized was by taking the mean of the value of the logarithm of light transmission intensity within a given portion of the maximum height region and assigning this a value of 1, taking the mean of the value of the logarithm of light transmission intensity within a given portion of the minimum height region and assigning this a second value, and then normalizing other values with respect to these two values. (In some cases, the value of the logarithm of light transmission intensity within the given portion of the minimum height region is assigned a value of Euler's number (i.e., 2.718), although in the example shown in FIG. 4, this is not the case.) One would expect the normalized profile of any sample that fills the sample chamber to have a similar profile, irrespective of absolute hemoglobin absorption of the sample, since the shape of the profile is dependent upon the relative absorption along the different regions of the sample chamber.

Thin curve 72 in FIG. 4 shows the normalized logarithm-of-transmission-intensity recorded along the length of a sample chamber for a given sample. It may be observed that within the minimum height region, there is a relatively flat portion of the curve (which is below curve 70) and then a peak (which is above curve 70). In addition, along the medium height region, curve 72 is below curve 70. Typically, such a profile is indicative of the fact that there is a bubble (e.g., an air bubble, and/or the presence of a different substance) within the minimum height region. At the location of the bubble, the light transmission is greater, causing there to be a peak in curve 72 at this location. At other locations (e.g., within other portions of the minimum height region) and along the entire medium height region, the presence of the bubble within the minimum height region causes the normalized logarithm-of-transmission-intensity values to be lowered relative to those of a sample that does not contain a bubble. Similarly, when there are bubbles within other regions of the sample chamber (or along an entire region), this will give rise to a different normalized logarithm-of-transmission-intensity profile. For example, if there would be a bubble along the entire minimum height region, this would cause the normalized logarithm-of-transmission-intensity within the medium height region to be lowered relative to that of a sample that does not contain a bubble. For some applications, the height of the chamber varies in a different manner, but generally similar techniques are performed, mutatis mutandis.

Therefore, in accordance with some applications of the present invention, in addition to measuring absolute values of a parameter that is indicative of light transmission along the length of the sample chamber, normalized values of a parameter that is indicative of light transmission (e.g., normalized logarithm of light transmission intensity) are determined along the sample chamber. Based upon the normalized values of the parameter, the computer processor determines that there is likely to be a bubble (e.g., an air bubble or presence of a different substance) within the sample chamber. For some applications, in response to determining that there is likely to be a bubble within the sample chamber the computer processor generates an output. For example, the computer processor may generate an error message (e.g., a message indicating that the sample chamber should be refilled), may invalidate the sample, and/or may invalidate a portion of the measurements that are performed upon the sample.

For some applications, the computer processor performs optical absorption measurements, but only uses the regions of the chamber in which there are no bubble present, for doing so. Thus, for some applications, based upon an absolute value of a parameter that is indicative of light transmission at at least some of regions within the sample chamber, the computer processor calculates hemoglobin concentration within the sample. In addition, the computer processor normalizes the parameter as measured at the respective regions within the sample chamber with respect to each other. At least partially in response to the normalized parameter, the computer processor determines which of the regions to use for calculating hemoglobin concentration within the sample. Alternatively, the computer processor may invalidate the sample from being used for calculating hemoglobin concentration within the sample, and/or may generate an error message (e.g., a message indicating that the sample chamber should be refilled).

Along the width of the chamber, the sample is expected to have an absorption profile that is substantially constant. For some applications, the computer processor is configured to interpret an unexpectedly low level of absorption (which does not conform with the above-described profiles) as being indicative of the presence of an air bubble. For some applications, in order to determine whether there is a presence of air bubbles, one or more optical absorption measurements are performed at a wavelength at which hemoglobin does not absorb light (e.g., using green light). Alternatively or additionally, a camera (e.g., the CCD camera or CMOS camera of the microscope) is used to image the second portion of the blood sample, and the computer processor determines whether there is a presence of air bubbles based upon the image(s).

Typically, one or more parameters of the sample are determined by the computer processor, based upon the optical measurements. For some applications, at least some of the optical measurements are invalidated from being used to determine the one or more parameters of the sample, based upon determining that the one or more air bubbles are present within the chamber. For some applications, the computer processor generates an output indicating that the portion of the blood sample has been invalidated from being used to perform at least some measurements upon the sample, based upon determining that the one or more air bubbles are present within the sample chamber.

For some applications, generally similar techniques are performed with respect to the first portion of the blood sample, which is placed in first set 52 of sample chambers. For example, the computer processor may be configured to identify a region in which the sample is not present, within a microscopic image of the sample chamber, and to invalidate at least the identified region from being used in microscopic analysis of the portion of the sample. For some applications, the computer processor is configured to identify such a region by identifying an interface between a wet region and a dry region upon the base surface of the sample chamber. Typically, in identifying such a region, the computer processor is configured to distinguish between regions in which the sample is not present and regions in which the sample is present and the sample has a low cell density.

For some applications, the computer processor is configured to identify a presence of dirt (e.g., spilled blood) on an outer surface of the sample carrier. As described hereinabove, typically, at least one microscope image is acquired of a monolayer of cells that has settled on a base surface of the sample carrier. Typically, the image is acquired while the microscope is focused on a monolayer focal plane, with the monolayer of cells being disposed within the monolayer focal plane. For some applications, the computer processor identifies that dirt is disposed on the top cover of the sample carrier or on an underside of the base surface by identifying a region in which an entity is visible at a focal plane that is different from the monolayer focal plane. Alternatively or additionally, the computer processor identifies a region in which a background intensity of the microscope image (which was acquired at the monolayer focal plane) is indicative of dirt is disposed on the top cover or on an underside of the base surface. For some applications, in response thereto, the computer processor invalidates at least the identified region from being used in microscopic analysis of the portion of the sample.

As described hereinabove, typically, the first portion of the blood sample is imaged under brightfield imaging, i.e., under illumination from one or more brightfield light sources (e.g., one or more brightfield-light-emitting-diodes, which typically emit light at respective spectral bands). Further typically, the first portion of the blood sample is additionally imaged under fluorescent imaging. Typically, the fluorescent imaging is performed by exciting stained objects within the sample by directing light toward the sample at known excitation wavelengths (i.e., wavelengths at which it is known that stained objects emit fluorescent light if excited with light at those wavelengths), and detecting the fluorescent light. Typically, for the fluorescent imaging, a separate set of one or more fluorescence-light-emitting-diodes is used to illuminate the sample at the known excitation wavelengths.

For some applications, the computer processor analyzes light that is emitted by the brightfield light source, and determines a characteristic of the brightfield light source. For example, the computer processor may periodically determine whether the spatial distribution of the illumination by the brightfield light source has changed since a previous measurement (e.g., whether the spatial uniformity of the illumination has changed or whether the spatial location has changed since a previous measurement), whether vignette effects of the illumination by the brightfield light source has changed since a previous measurement, whether the spectral distribution of the illumination by the brightfield light source has changed since a previous measurement, and/or whether the intensity of the illumination by the brightfield light source has changed since a previous measurement. As described hereinabove, typically, the computer processor determines a parameter of the blood sample by performing measurements upon entities that are identified within the microscopic images of the blood sample. For some applications, such measurements are normalized based upon the determined characteristic of the brightfield light source. For some applications, at least some measurements are invalidated from being performed upon the blood sample, based upon the determined characteristic of the brightfield light source.

For some applications, in order to determine the characteristic of the brightfield light source, the computer processor analyzes light that is emitted by the brightfield light source in the absence of the sample carrier. Alternatively or additionally, the computer processor analyzes light that is emitted by the brightfield light source that passes through intercellular regions within the blood sample.

For some applications, the computer processor analyzes light that is emitted by the fluorescent light source, and determines a characteristic of the fluorescent light source. For example, the computer processor may periodically determine whether the spatial distribution of the illumination by the fluorescent light source has changed since a previous measurement (e.g., whether the spatial uniformity of the illumination has changed or whether the spatial location has changed since a previous measurement), whether vignette effects of the illumination by the fluorescent light source has changed since a previous measurement, whether the spectral distribution of the illumination by the fluorescent light source has changed since a previous measurement, and/or whether the intensity of the illumination by the fluorescent light source has changed since a previous measurement. As described hereinabove, typically, the computer processor determines a parameter of the blood sample by performing measurements upon entities that are identified within the microscopic images of the blood sample. For some applications, such measurements are normalized based upon the determined characteristic of the fluorescent light source. For some applications, at least some measurements are invalidated from being performed upon the blood sample, based upon the determined characteristic of the fluorescent light source.

For some applications, in order to determine the characteristic of the fluorescent light source, the computer processor identifies one or more fluorescent regions that are visible within a microscopic image that that is acquired under lighting by the fluorescent light source, other than the stained cells, and determines a characteristic of the fluorescent light source, based upon the identified fluorescent regions. For example, such fluorescent regions may include intercellular regions within the blood sample, one or more fluorescent regions of the microscopy unit, and/or one or more fluorescent regions of the sample carrier (e.g., the pressure-sensitive adhesive of the sample carrier, described hereinabove). For some applications, the sample carrier is placed upon a stage within the microscopy unit, and the stage includes fluorescent regions for performing the above-described measurements. Alternatively or additionally, the sample carrier includes a fluorescent region (e.g., a fluorescent patch), for performing the above described measurements.

For some applications, the computer processor is configured to detect whether portions of the microscopy unit (such as the CCD camera, the CMOS camera, the lenses, and/or the stage for holding the sample carrier) have dirt or scratches on them, by acquiring microscopic images in the absence of any sample carrier and identifying direct or scratches in such images. For some applications, such images are acquired periodically (e.g., at fixed intervals in time), in order to determine whether the microscopy unit whether portions of the microscopy unit have dirt or scratches on them. For some applications, in response to detecting such dirt and/or scratches, this is flagged to the user. Alternatively or additionally, regions within images that correspond to the locations at which the dirt and/or scratches are present are not included in at least some the image analysis of the samples. Further alternatively or additionally, measurements that are performed upon regions within images that correspond to the locations at which the dirt and/or scratches are present are calibrated, in order to account for the dirt and/or scratches.

For some applications, the computer processor is configured to detect whether portions of the sample carrier have dirt or scratches on them, using generally similar techniques to the aforementioned techniques. For example, the sample carrier may be imaged in the absence of a sample therein. For some applications, the computer processor is configured to detect whether portions of the sample carrier fluoresce irregularly, e.g., by imaging the sample carrier in the absence of a sample therein.

For some applications, in response to detecting that there is an error in at least some of the fluorescent microscopic images, the computer processor classifies the source of the error as follows. In response to detecting that the error was introduced from a given point in time, the computer processor identifies the stain as being the source of the error, since this indicates that the error was introduced as a result of a new batch of the stain being used. In response to detecting that the error gradually increased over time, the computer processor identifies dirt within the microscopy unit as being the source of the error, since such dirt typically causes a gradual degradation over time. In response to detecting that the error is present only in images acquired under illumination by a given one of the light sources (e.g., light emitting diodes), the computer processor identifies the given one of the light sources as being the source of the error.

For some applications, the optical measurement unit includes a microscope that includes a microscope stage upon which the sample carrier is typically placed. Typically, the computer processor drives the microscope stage to move using one or more motors that are used to drive movement of mechanical elements. In some cases, there is a degree of backlash associated with the movement of the mechanical elements. For example, when the direction of the movement is initiated or reversed, there may be a delay between the computer-implemented instructions being delivered to the motors and the movement of the mechanical elements being implemented. For some applications, the computer processor accounts for this effect when performing any movement (e.g., by assuming that there is a given fixed delay, or by periodically measuring the delay and accounting for the delay as most-recently measured). For some applications, the amount of backlash is quantified using the microscopic system, and the amount of backlash is interpreted as being indicative of the condition of the mechanical elements and/or the motor(s). For example, the amount of backlash may be quantified by observing how many motor steps are required to create a discernible movement in the microscope system, and/or by repeating the same measurement in two different directions of motions and correlating between images or metrics extracted from images associated with the motion in the two different directions. For some applications, based upon the above-described measurements, the condition of the mechanical elements and/or the motor(s) is determined. For some applications, an output is generated in response to the determined condition of the mechanical elements and/or the motor(s). For example, at least some images of a sample (and/or data relating to the sample) may be rejected from being analyzed, the microscope and/or other portions of the optical measurement unit may be locked such that they cannot be used, and/or an alert may be generated (e.g., an alert indicating that servicing is required and/or an alert indicating that preemptive servicing is advisable may be generated).

For some applications, microscopic images (and/or other signals) are acquired during movement of the stage. For some such applications, there may be timing mismatches between the reported or interpolated location of the stage at a given time and the actual timing of the camera or sensor acquisition at that location. This may lead to an error in the assumed position where a given image was (or data were) acquired and may subsequently lead to additional error if this position is used for other purposes (e.g., if this image (or these data) and the corresponding location are used an input for focusing the microscope). For some applications, such a timing mismatch is measured by using two measurements of the same target, for example, as follows. A first image of the target (or set of data associated with the target) is acquired using a static acquisition along the mechanical axis and a second image of the target (or set of data associated with the target) is acquired using acquisition during movement of the stage. Differences between images or metrics extracted from images (and/or differences between the two sets of data) are detected, if such differences are detected, the computer processor uses this as an input for determining that there is a timing mismatch, and/or for correcting the timing mismatch. For some applications, such measurements are made periodically, and are used as an input for determining the state of portions of the optical measurement system (such as portions of the microscope system, including the image-acquisition portion, mechanical elements, and/or motors). For some applications, in response to detecting that there is a timing mismatch and/or a difference relative to a previous measurement, an output is generated. For example, at least some images of a sample (and/or data relating to the sample) may be rejected from being analyzed, the microscope and/or other portions of the optical measurement unit may be locked such that they cannot be used, and/or an alert may be generated (e.g., an alert indicating that servicing is required and/or an alert indicating that preemptive servicing is advisable may be generated).

For some applications, the status of the optical-measurement unit (e.g., a microscope of the optical measurement system, and/or an optical-absorption measurement portion of the optical-measurement unit) is estimated by imaging a target that is installed in the optical-measurement unit itself (or is routinely inputted into the optical-measurement unit). For example, a scratched glass surface, a printed glass surface, one or more fluorescent or non-fluorescent beads, pinholes, or any other resolution target may be used. For some applications, by acquiring and analyzing images of (and/or data relating to) such a target, the computer processor derives optical attributes of the optical-measurement unit, such as aberration, resolution, contrast, scatter and attenuation. For some applications, the computer processor performs such an analysis periodically, and compares the determined attributes to predetermined values. For some applications, in response to detecting that there is a difference between one or more of the determined attributes and the predetermined values, an output is generated. For example, at least some images of a sample (and/or data relating to the sample) may be rejected from being analyzed, the microscope and/or other portions of the optical measurement unit may be locked such that they cannot be used, and/or an alert may be generated (e.g., an alert indicating that servicing is required and/or an alert indicating that preemptive servicing is advisable may be generated). For some applications, based upon the determined attributes, the computer processor corrects extracted image features, measured values (in case of a non-imaging measurement), and/or measurands of a sample. For example, absorption measurements may be corrected due to change in apparent contrast in the target.

For some applications, the sample as described herein is a sample that includes blood or components thereof (e.g., a diluted or non-diluted whole blood sample, a sample including predominantly red blood cells, or a diluted sample including predominantly red blood cells), and parameters are determined relating to components in the blood such as platelets, white blood cells, anomalous white blood cells, circulating tumor cells, red blood cells, reticulocytes, Howell-Jolly bodies, etc.

In general, it is noted that although some applications of the present invention have been described with respect to a blood sample, the scope of the present invention includes applying the apparatus and methods described herein to a variety of samples. For some applications, the sample is a biological sample, such as, blood, saliva, semen, sweat, sputum, vaginal fluid, stool, breast milk, bronchoalveolar lavage, gastric lavage, tears and/or nasal discharge. The biological sample may be from any living creature, and is typically from warm blooded animals. For some applications, the biological sample is a sample from a mammal, e.g., from a human body. For some applications, the sample is taken from any domestic animal, zoo animals and farm animals, including but not limited to dogs, cats, horses, cows and sheep. Alternatively or additionally, the biological sample is taken from animals that act as disease vectors including deer or rats.

For some applications, similar techniques to those described hereinabove are applied to a non-bodily sample. For some applications, the sample is an environmental sample, such as, a water (e.g. groundwater) sample, surface swab, soil sample, air sample, or any combination thereof. In some embodiments, the sample is a food sample, such as, a meat sample, dairy sample, water sample, wash-liquid sample, beverage sample, and/or any combination thereof.

Applications of the invention described herein can take the form of a computer program product accessible from a computer-usable or computer-readable medium (e.g., a non-transitory computer-readable medium) providing program code for use by or in connection with a computer or any instruction execution system, such as computer processor 28. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Typically, the computer-usable or computer readable medium is a non-transitory computer-usable or computer readable medium.

Examples of a computer-readable medium include a semiconductor or solid state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor (e.g., computer processor 28) coupled directly or indirectly to memory elements (e.g., memory 30) through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present invention may be written in any combination of one or more programming languages, including an object-oriented programming language such as Java, Smalltalk, C++ or the like and conventional procedural programming languages, such as the C programming language or similar programming languages.

It will be understood that algorithms described herein, can be implemented by computer program instructions. These computer program instructions may be provided to a processor of a general-purpose computer, special purpose computer, or other programmable data processing apparatus to produce a machine, such that the instructions, which execute via the processor of the computer (e.g., computer processor 28) or other programmable data processing apparatus, create means for implementing the functions/acts specified in the algorithms described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the flowchart blocks and algorithms. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the algorithms described in the present application.

Computer processor 28 is typically a hardware device programmed with computer program instructions to produce a special purpose computer. For example, when programmed to perform the algorithms described herein, computer processor 28 typically acts as a special purpose sample-analysis computer processor. Typically, the operations described herein that are performed by computer processor 28 transform the physical state of memory 30, which is a real physical article, to have a different magnetic polarity, electrical charge, or the like depending on the technology of the memory that is used.

The apparatus and methods described herein may be used in conjunction with apparatus and methods described in any one of the following patent applications, all of which are incorporated herein by reference:

US 2012/0169863 to Bachelet;
US 2014/0347459 to Greenfield;
US 2015/0037806 to Pollak;
US 2015/0316477 to Pollak;
US 2016/0208306 to Pollak;
US 2016/0246046 to Yorav Raphael;
US 2016/0279633 to Bachelet;
US 2018/0246313 to Eshel;
WO 16/030897 to Yorav Raphael;
WO 17/046799 to Eshel;
WO 17/168411 to Eshel;
WO 17/195205 to Pollack;
US 2019/0145963 to Zait; and
WO 19/097387 to Yorav-Raphael.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method comprising:
preparing a blood sample for analysis by:
depositing the blood sample within a sample chamber; and
placing the sample chamber, with the blood sample deposited therein, within a microscopy unit;
acquiring one or more microscopic images of the sample chamber with the blood sample deposited therein, using a microscope of the microscopy unit;
determining whether more than a threshold amount of red blood cells within the sample chamber had already settled within a monolayer within the sample chamber, prior to acquisition of the one or more microscopic images, by analyzing the red blood cells within the one or more microscopic images; and
calibrating measurements that are performed upon the blood sample at least partially in response to determining that more than the threshold amount of red blood cells within the sample chamber had already settled within the monolayer within the sample chamber, prior to acquisition of the one or more microscopic images.

2. The method according to claim 1, wherein preparing the blood sample for analysis further comprises staining the blood sample with one or more stains.

3. The method according to claim 1, further comprising determining an indication of how long the blood sample has been in the sample chamber prior to acquisition of the one or more microscopic images, based upon the amount of the red blood cells that had already settled within the sample chamber, prior to acquisition of the one or more microscopic images.

4. The method according to claim 1, wherein preparing the blood sample for analysis further comprises staining the blood sample with one or more stains, wherein calibrating the measurements comprises calibrating the measurements to account for an amount of staining that entities within the blood sample underwent as indicated by more than the threshold amount of red blood cells within the sample chamber having already settled within the sample chamber, prior to acquisition of the one or more microscopic images.

5. Apparatus for use with a blood sample that has been deposited within a sample chamber, the apparatus comprising:
- a microscopy unit comprising a microscope that is configured to acquire one or more microscopic images of the sample chamber with the blood sample deposited therein; and
- at least one computer processor configured to:
  - determine whether more than a threshold amount of red blood cells within the sample chamber had already settled within a monolayer within the sample chamber, prior to acquisition of the one or more microscopic images, by analyzing the red blood cells within the one or more microscopic images; and
  - calibrate measurements that are performed upon the blood sample at least partially in response to determining that more than the threshold amount of red blood cells within the sample chamber had already settled within the monolayer within the sample chamber, prior to acquisition of the one or more microscopic images.

6. The apparatus according to claim 5, wherein the computer processor is configured to determine an indication of how long the blood sample has been in the sample chamber prior to acquisition of the one or more microscopic images, based upon the amount of the red blood cells that had already settled within the sample chamber, prior to acquisition of the one or more microscopic images.

7. The apparatus according to claim 5, wherein the blood sample is stained with one or more stains, and wherein the computer processor is configured to calibrate the measurements to account for an amount of staining that entities within the blood sample underwent as indicated by more than a threshold amount of red blood cells within the sample chamber having already settled within the sample chamber, prior to acquisition of the one or more microscopic images.

* * * * *